United States Patent [19]

Motoyama et al.

[11] Patent Number: 5,504,891

[45] Date of Patent: Apr. 2, 1996

[54] METHOD AND APPARATUS FOR FORMAT CONVERSION OF A HIERARCHICALLY STRUCTURED PAGE DESCRIPTION LANGUAGE DOCUMENT

[75] Inventors: Tetsuro Motoyama, San Jose; Satwinder S. Mangat, Santa Clara; Donny Tsay, San Jose, all of Calif.

[73] Assignees: Ricoh Company, Ltd., Tokyo, Japan; Ricoh Corporation, San Jose, Calif.

[21] Appl. No.: 261,184

[22] Filed: Jun. 13, 1994

Related U.S. Application Data

[63] Continuation-in-part of Ser. No. 208,466, Mar. 9, 1993, which is a continuation-in-part of Ser. No. 147,603, Nov. 4, 1993, Ser. No. 66,383, May 21, 1993, Pat. No. 5,436,627, and Ser. No. 6,416, Jan. 19, 1993, Pat. No. 5,438,650, each is a continuation-in-part of Ser. No.931,808, Aug. 11, 1992, Pat. No. 5,416,896, which is a continuation-in-part of Ser. No. 876,601, Apr. 30, 1992, Pat. No. 5,319,748, Ser. No. 876,251, Apr. 30, 1992, Pat. No. 5,325,484, and Ser. No. 778,578, Oct. 17, 1991, Pat. No. 5,353,388.

[51] Int. Cl.⁶ .................................................. G06F 17/30
[52] U.S. Cl. .................. 395/600; 395/144; 364/260.4; 364/283.1; 364/DIG. 1
[58] Field of Search ..................................... 395/600, 425, 395/144, 145, 146, 147, 148; 364/419

[56] References Cited

U.S. PATENT DOCUMENTS

| | | | |
|---|---|---|---|
| 4,751,740 | 6/1988 | Wright | 382/1 |
| 4,951,196 | 8/1990 | Jackson | 364/401 |
| 5,021,995 | 6/1991 | Quint et al. | 395/600 |
| 5,173,853 | 12/1992 | Kelly et al. | 364/419.1 |

OTHER PUBLICATIONS

ISO/IEC DIS 10180, Information Processing–Text Communication–Standard Page Description Language; Draft International Standard 1991–03, 1991.
Simone, L. "Vector File Conversion Utilities" PC Magazine, vol. 10, No. 2, p. 243(11), Jan. 29, 1991.
Whitney, G. "The Write Stuff. The Ultimate Word Processor?" Interface Age, vol. 9, No. 11, pp. 74–75, 1984.

*Primary Examiner*—Thomas G. Black
*Assistant Examiner*—Peter Y. Wang
*Attorney, Agent, or Firm*—Oblon, Spivak, McClelland, Maier & Neustadt

[57] ABSTRACT

A method and system for converting a document from a clear text representation to a binary representation. There is not a one to one correspondence between the two formats in SPDL. In order to determine what binary representation is needed for a clear text tag which can have a plurality of binary representations, it is necessary to actually process at least portions of the document for presentation (in contrast to just converting the document to a new format) in order to determine which binary representation of the tag is to be used. A stack is used to keep track of the binary elements as they are being converted. This allows for an efficient handling of the binary length encoding because the length of the binary representation of the different hierarchical levels of a document are not known until the respective hierarchical levels are encoded. An element table having pointers to sub-element linked lists can be used as a reference to determine the binary representation of the clear text tags and whether the document being converted has used proper syntax.

19 Claims, 37 Drawing Sheets

| | | | |
|---|---|---|---|
| 1 | IDENTIFIER | 1 BYTE | |
| 2 | LENGTH 400 | 2 BYTES DEFINITE | |
| 3 | CONTENTS (400 BYTES CONTENTS) | | |
| 4 |     IDENTIFIER | 2 BYTES | |
| 5 |     LENGTH | 1 BYTE INDEFINITE | |
| 6 |     CONTENTS | | |
| 7 |         IDENTIFIER | 1 BYTE | |
| 8 |         LENGTH 248 | 2 BYTES DEFINITE | |
| 9 |         CONTENTS (248 BYTES CONTENTS) | | |
| 10 |         IDENTIFIER | 1 BYTE | |
| 11 |         LENGTH 40 | 1 BYTE DEFINITE | |
| 12 |         CONTENTS (40 BYTES CONTENTS) | | |
| 13 |     0000H | | |
| 14 |     IDENTIFIER | 1 BYTE | |
| 15 |     LENGTH 100 | 1 BYTE DEFINITE | |
| 16 |     CONTENTS (100 BYTES CONTENTS) | | |
| 17 | IDENTIFIER | 1 BYTE | |
| 18 | LENGTH 250 | 1 BYTE DEFINITE | |
| 19 | CONTENTS (250 BYTES CONTENTS) | | |

```
<!DOCTYPE SPDL PUBLIC "ISO/IEC 10180//DTD SPDL Instance//EN">
<SPDL>
<document>
    <pageset spdlid = "ISO/IEC 10180//SPDL">
        <comment>spdlid = Public Object ID value</comment>
        <psbody>
            <picture spdlid="ISO/IEC 10180//SPDL"
                     cntnttyp="ISO/IEC 10180//ContentType/SPDLClearText">
                <comment> Public Object ID</comment>
            </picture>
            <picture spdlid="ISO/IEC 10180//SPDL"
                     cntnttype="ISO/IEC 10180//ContentType/SPDLClearText">
            </picture>
        </psbody>
    </pageset>
</document>
</SPDL>
```

*FIG. 5B*

FIG. 6 pageset: 61  length: 59  spldid: 06  length: 04  ISO/IEC 10180//SPDL: 28 CF 44 00 comment: 44  length: 1F  s: 73  p: 70  d: 64  I: 63  i: 69  d: 64  space: 20  =: 3D  space: 20

P: 50  u:75  b:62  l:6C  i:69  c:63  space:20  O: 4F  b:62  j: 6A  e:65 c: 63  t:74  space:20  I: 49  D:44  space:20  v: 76  a:61  l: 6C  u:75  e:65 psbody: A1  length: 30  picture: 62  length: 1F  spdlid: 06  length: 04

ISO/IEC 10180//SPDL: 28 CF 44 00  cntnttyp: 80  length: 05

ISO/IEC 10180//ContentType/SPDLBinary: 28 CF 44 01 00  comment: 44  length:10

Public Object ID: 50 75 62 6C 69 63 20 4F 62 6A 65 63 74 20 49 44 picture: 62  length: 0D  spdlid: 06  length: 04  ISO/IEC 10180//SPDL: 28 CF 44 00 cntnttyp: 80  length:05  ISO/IEC 10180//ContentType/SPDLBinary: 28 CF 44 01 00

| CLEAR TEXT TAG | ELEMENT DECLARATION | # OF ATTRIBUTES | # OF SUB-ELEMENTS | POINTER TO SUB-ELEMENTS |
|---|---|---|---|---|
| !DOCTYPE | NONE | ? | 1 | |
| SPDL | CHOICE | 0 | 25 | |
| PICTURE | IMPLICIT SEQUENCE | 1 | 4 | |
| PICTBDY | IMPLICIT SEQUENCE | 0 | 3 | |
| TKNSEQN | OCTETSTRING | 0 | 0 | |

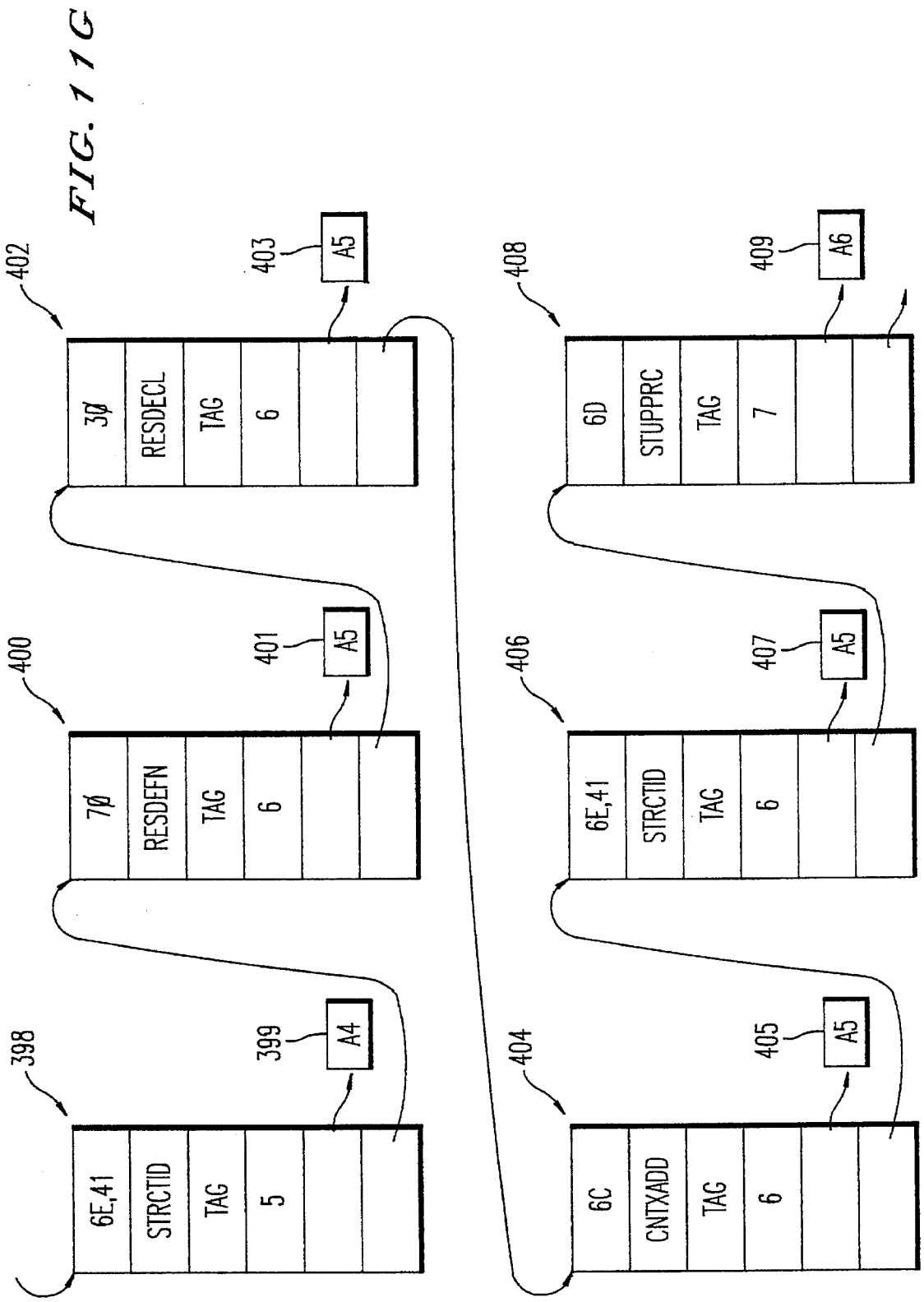

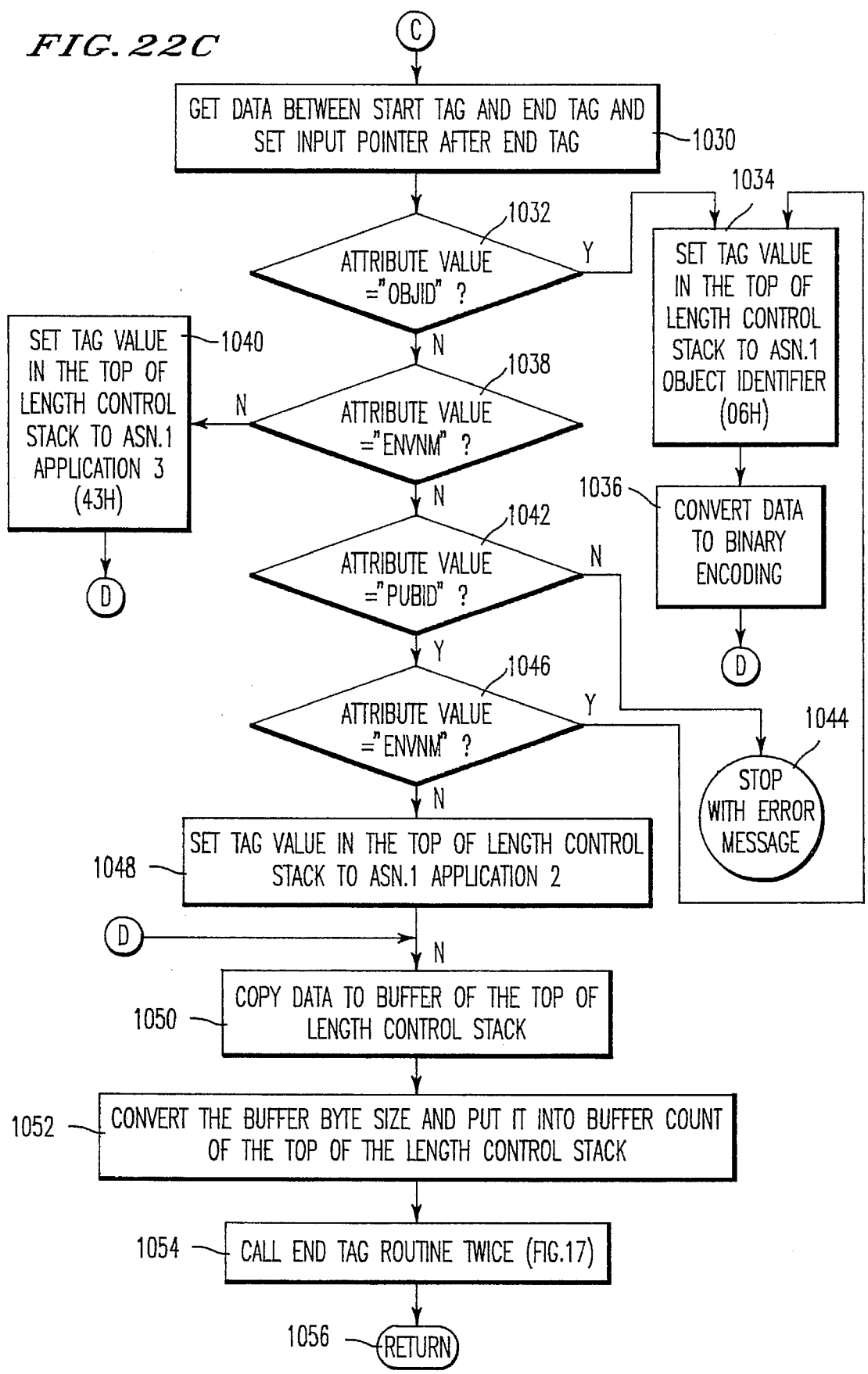

FIG. 26

```
1   <!DOCTYPE SPDL PUBLIC "ISO/IEC 10180//DTD Standardized Page
    Description Language/ /EN">
2   <SPDL>
3     <PICTURE CONTREP = "ISO/IEC 10180/ /content: :spdl-clear-text">
4       <PICTBDY>
5         <PROLOGUE>
6           <EXTNDCL STRCLID = "PICTURE">
7             <STRCTID>
8               MyPict
9             </STRCTID>
10            <LOCLCID>
11              /test/mypicture
12            </LOCLCID>
13          </EXTNDCL>
14          <EXTNDCL STRCDID = "PICTURE">
15            <STRCTID>
16              MyPict2
17            </STRCTID>
18            <LOCLCID>
19              /test/mypicture2
20            </LOCLCID>
21          </EXTNDCL>
22          <STUPPRC>
23            <TKNSEQN>
24              2 setlinewidth
25            </TKNSEQN>
26          </STUPPRC>
27        </PROLOGUE>
28        <STRCTID>
29          MyPict
30        </STRCTID>
31        <TKNSEQN>
32          10 10 moveto
33          20 20 lineto
34          stroke
35        </TKNSEQN>
36      </PICTBDY>
37    </PICTURE>
38  </SPDL>
```

| SPDL | 28 | 7 | NO | |

| PICTURE | 66 | 0 | NO | |
| SPDL | 28 | 7 | NO | |

→ NO ENTRY
→ - - -

*FIG. 27B*

| CNTREP | A0 | 0 | NO | |
| PICTURE | 66 | 0 | NO | |
| SPDL | 28 | 7 | NO | |

→ NO ENTRY
→ NO ENTRY
→ - - -

*FIG. 27C*

| CNTREP | A0 | 8 | NO | |
| PICTURE | 66 | 0 | NO | |
| SPDL | 28 | 7 | NO | |

→ 06 06 28 CF 44 00 02 00
→ NO ENTRY
→ - - -

*FIG. 27D*

| PICTURE | 66 | 10 | NO | |
| SPDL | 28 | 7 | NO | |

| PICTBDY | 67 | 0 | NO | |
| PICTURE | 66 | 10 | NO | |
| SPDL | 28 | 7 | NO | |

→ NO ENTRY
→ - - -
→ - - -

*FIG. 27F*

| PROLOGUE | 68 | 0 | NO | | → NO ENTRY |
| PICTBDY | A0 | 0 | YES | | → NO ENTRY |
| PICTBDY | 67 | 0 | NO | | → NO ENTRY |
| PICTURE | 66 | 10 | NO | | → - - - |
| SPDL | 28 | 7 | NO | | → - - - |

*FIG. 27G*

| EXTNDCL | 30 | 0 | NO | | → NO ENTRY |
| PROLOGUE | A0 | 0 | YES | | → NO ENTRY |
| PROLOGUE | 68 | 0 | NO | | → NO ENTRY |
| PICTBDY | A0 | 0 | YES | | → NO ENTRY |
| PICTBDY | 67 | 0 | NO | | → NO ENTRY |
| PICTURE | 66 | 10 | NO | | → - - - |
| SPDL | 28 | 7 | NO | | → - - - |

*FIG. 27H*

| EXTNDCL | 30 | x | NO | | → - - - |
| PROLOGUE | A0 | 0 | YES | | → NO ENTRY |
| PROLOGUE | 68 | 0 | NO | | → NO ENTRY |
| PICTBDY | A0 | 0 | YES | | → NO ENTRY |

*FIG. 27I*

| PROLOGUE | A0 | y | YES | | → 30 XX - - - |
| PROLOGUE | 68 | 0 | NO | | → - - - |
| PICTBDY | A0 | 0 | YES | | → - - - |

*FIG. 27J*

| EXTNDCL | 30 | 0 | NO | | → NO ENTRY |
|---|---|---|---|---|---|
| PROLOGUE | A0 | Y | YES | | → 30 XX – – – |
| PROLOGUE | 68 | 0 | NO | | → – – – |
| PICTBDY | A0 | 0 | YES | | → – – – |

| EXTNDCL | 30 | XY | NO | | → – – – |
|---|---|---|---|---|---|
| PROLOGUE | A0 | Y | YES | | → 30 XX – – – |
| PROLOGUE | 68 | 0 | NO | | → |

| PROLOGUE | A0 | YY | YES | | → 30 XY – – – 30 XY – – – |
|---|---|---|---|---|---|
| PROLOGUE | 68 | 0 | NO | | → NO ENTRY |

| | | | | | |
|---|---|---|---|---|---|
| PROLOGUE | 68 | N | NO | | → A0 YY 30 XY – – – 30 XY |

| | | | | |
|---|---|---|---|---|
| STUPPROC | 6D | 0 | NO | ← NO ENTRY |
| PROLOGUE | A6 | 0 | YES | ← NO ENTRY |
| PROLOGUE | 68 | N | NO | ← A0 YY 30 XX – – – 30 XY |

*FIG. 27O*

| | | | | |
|---|---|---|---|---|
| STUPPROC | 6D | M | NO | ← – – – |
| PROLOGUE | A6 | 0 | YES | ← NO ENTRY |
| PROLOGUE | 68 | N | NO | ← – – – |
| PICTBDY | A0 | 0 | YES | ← NO ENTRY |

*FIG. 27P*

| | | | | |
|---|---|---|---|---|
| PROLOGUE | A6 | NM | YES | ← 6D MM – – – |
| PROLOGUE | 68 | N | NO | ← A0 YY 30 – – – |
| PICTBDY | A0 | 0 | YES | ← NO ENTRY |

*FIG. 27Q*

| | | | | |
|---|---|---|---|---|
| PROLOGUE | 68 | NN | NO | ← A0 YY 30 – – – A6 NM – – |
| PICTBDY | A0 | 0 | YES | ← NO ENTRY |
| PICTBDY | 67 | 0 | NO | ← NO ENTRY |

*FIG. 27R*

| | | | | |
|---|---|---|---|---|
| PICTBDY | A0 | P | YES | ← 68 NN A0 YY 30 – – – |
| PICTBDY | 67 | 0 | NO | ← NO ENTRY |

*FIG. 27S*

| | | | | |
|---|---|---|---|---|
| | | | | |
| | | | | |
| PICTBDY | 67 | Q | NO | | → A0 PP 68 NN A0 YY 30

*FIG. 27T*

| | | | | |
|---|---|---|---|---|
| STRCTID | 6E | 0 | NO | | → NO ENTRY
| PICTBDY | A1 | 0 | YES | | → NO ENTRY
| PICTBDY | 67 | Q | NO | | → - - -
| PICTURE | 66 | 0 | NO | | → NO ENTRY

*FIG. 27U*

| | | | | |
|---|---|---|---|---|
| STRCTID | 41 | 6 | NO | | → MYPICT
| STRCTID | 6E | 0 | NO | | → NO ENTRY
| PICTBDY | A1 | 0 | YES | | → NO ENTRY
| PICTBDY | 67 | Q | NO | | → - - -
| PICTURE | 66 | 0 | NO | | → NO ENTRY

*FIG. 27V*

| | | | | |
|---|---|---|---|---|
| PICTBDY | A1 | 10 | YES | | → 6E 08 41 06 "MYPICT"
| PICTBDY | 67 | Q | NO | | → - - -

*FIG. 27W*

METHOD AND APPARATUS FOR FORMAT CONVERSION OF A HIERARCHICALLY STRUCTURED PAGE DESCRIPTION LANGUAGE DOCUMENT

CROSS REFERENCES TO RELATED APPLICATIONS

This application is a continuation-in-part of U.S. patent application 08/208,466, filed on Mar. 9, 1994, and entitled "METHOD AND APPARATUS FOR FORMAT CONVERSION OF A HIERARCHICALLY STRUCTURED PAGE DESCRIPTION LANGUAGE DOCUMENT", now pending, which is a continuation-in-part of U.S. patent application 08/147,603 filed on Nov. 4, 1993 and entitled "STANDARD PAGE DESCRIPTION LANGUAGE Clear text STRUCTURE GENERATOR", now pending, U.S. patent application 08/066,383 filed May 21, 1993 and entitled "METHOD AND SYSTEM FOR PROCESSING MIXED BINARY LENGTH ENCODINGS CONTAINING DEFINITE AND INDEFINITE LENGTH FORMATS", now U.S. Pat. No. 5,436,627, and U.S. patent application 08/006,416 filed Jan. 19, 1993 and entitled "METHOD AND SYSTEM TO RECOGNIZE ENCODING TYPE IN DOCUMENT PROCESSING LANGUAGE", now U.S. Pat. No. 5,438,650, each of which is a continuation-in-part of U.S. patent application, 07/931,808 filed on Aug. 11, 1992 and entitled "A Method And System to Handle Dictionary Generation and Context Declaration in a Document Processing Language", now U.S. Pat. No. 5,416,896, which is a continuation-in-part of U.S. patent applications, 07/876,601 and 07/876,251 now U.S. Pat. Nos. 5,319,748 and 5,325,484, respectively, both filed on Apr. 30, 1992 and entitled "Method and Apparatus to Manage Picture and Pageset for Document Processing" and "Method and System to Handle Inclusion of External Files into a Document Processing Language," respectively, and a continuation-in-part of U.S. patent application 07/778,578 filed Oct. 17, 1991 and entitled "System and Method for Document Processing", now U.S. Pat. No. 5,353,388, each of which is incorporated herein by reference.

BACKGROUND OF THE INVENTION

1. Field of the Invention

This invention is directed towards a method and apparatus for converting the format of a document. This invention is more particularly related to a method and apparatus for conversion of a textual encoded document to a binary encoded document. This invention is even more related to the conversion of a clear text encoded Standard Page Description Language document to a binary encoded Standard Page Description Language document. This invention also performs a data compression function by converting a document to a format with a reduced size.

2. Discussion of the Background

A standardized page description language has been proposed and is being developed as an international standard by the International Organization for Standardization ("ISO"). The proposal, to which one of the inventors is a contributor, is currently in draft form before a section of the ISO. The draft is known as ISO/IEC DIS 10180, labeled "INFORMATION PROCESSING-TEXT COMMUNICATION-STANDARD PAGE DESCRIPTION LANGUAGE" and is available at the American National Standards Institute ("ANSI") in New York and incorporated herein by reference.

Standard Page Description Language ("SPDL") is a hierarchically structured page description language. This structured hierarchy allows a portion of a document to be printed without tracing through the entire document for formatting commands which may affect the particular portion being printed. Only the portion of the document which is hierarchically above the portion being printed needs to be processed to print the desired portion.

An additional advantage of SPDL is that it conforms to the Standard Generalized Markup Language ("SGML") as defined in ISO 8879:1986. This allows the structure of documents to be described and tagged in a generic fashion. Once tagged in SGML, files can travel seamlessly from one platform to another without the use of conversion utilities and without the loss of structural formatting.

SPDL conforms to the Basic Encoding Rules set forth in ASN.1. A complete description of ASN.1 can be found in "ASN.1, The Tutorial and Reference," by Douglas Steedman, 1990, which is incorporated herein by reference.

A clear text language is a type of computer language which is human readable. An example of a non-clear text language would be a binary encoding of a document as a human could not readily understand the contents of the document by looking at the binary or hexadecimal representation of the document. A primary advantage of a binary encoded document includes the fact that the binary represented document consumes much less storage space than the equivalent clear text format document. This allows for a smaller storage space of the binary document and a faster transmittal time of the binary document. However, the editing and understanding of a binary encoded document is difficult without the use of special software as compared to a clear text encoded document.

Therefore, as described above there are advantages and disadvantages to both the clear text encoding and binary encoding of a document and it may be desirable to convert a document from one format to another.

SUMMARY OF THE INVENTION

It is an object of this invention to provide a method and apparatus to convert a clear text encoded document to a binary encoded document.

It is another object of this invention to provide a method and apparatus to convert a clear text encoded Standard Page Description Language document to an equivalent binary encoded Standard Page Description Language document.

Because of the format required in a binary SPDL document and because there is not a one to one correspondence between the clear text and the binary representations, the present inventors have determined that it is not possible to perform a simple look-up procedure to convert a clear text encoded document to a binary encoded document. The representation of the various binary symbols depends upon the location of the binary symbols in the SPDL document.

Another problem which the present invention must deal with is keeping track of the length of each of the binary encoded processes. SPDL is a hierarchically structured page description language and the beginning of each hierarchical level of a binary encoding indicates whether the level is encoded in a definite or indefinite length format and the length of the encoding when there is a definite length binary encoding. A further problem which the present invention deals with is that the order of certain elements in a clear text encoding must be changed in the binary encoding. Therefore, it is necessary to know the required encoding order in the clear text SPDL format. Additionally, certain clear text elements may have different binary representations depending on the elements appearing before the textual representation of the element.

The present invention performs the clear text to binary conversion by using a length control stack to keep track of the elements as they are being converted. The length control stack allows the clear text to binary conversion process to proceed without knowing the length of each hierarchical level until the level is completely finished.

Clear text tags are stored in an element table. The element table has a pointer which refers to a sub-element linked list data structure used to keep track of the information pertaining to the sub-elements permitted to appear below the element. The sub-element linked list data structure has as its first entry an ASN.1 TAGS field which stores one or more ASN.1 tags. An ADDITIONAL ASN.1 TAG FIELD contains a pointer which points to null or an additional ASN.1 tag of the element, if it is necessary.

When processing the clear text tag STRCTID, there are different binary representations for this tag depending upon the parameters of the clear text STRCTID. To determine which binary representation of STRCTID is to be used, it is necessary to actually process portions of the clear text SPDL document, even though the document is only being converted from one format to another without processing the document for presentation by a presentation device. However, it is always possible to process the document for presentation before or after the conversion process. To process the STRCTID element, a picture/pageset stack is used to keep track of the various hierarchical levels. Each entry in the picture/pageset stack refers to a data structure containing at least the pageset level and picture level. Additionally within this data structure is a pointer to a STRCTID linked list data structure. This data structure contains an element indicating the structure ID, the structure type, and a pointer to a next structure ID linked list data structure.

During the conversion process, it is possible that the order of attributes of various SPDL elements in the clear text representation are different from the order required by the binary representation. Therefore, a temporary attribute buffer data structure is used to keep track of attributes for each of the elements. After all attributes of an element are written into the temporary attribute buffer linked list, the temporary attribute buffer linked list is reordered to place the attributes in proper order, this order corresponding to the order in the sub-element linked list data structures of the given element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates an example of nesting of definite and indefinite length formats for a binary encoding;

FIG. 5A is a hexadecimal representation of a sample binary encoded SPDL document;

FIG. 5B is a clear text representation of the binary document illustrated in FIG. 5A;

FIG. 6 is an illustration of the correspondence between the binary and clear text elements illustrated in FIGS. 5A and 5B;

FIGS. 11B–11G illustrate exemplary sub-element linked list data structures having the structure illustrated in FIG. 11A which are referred to by the element table illustrated in FIG. 10;

FIGS. 22A–22C illustrate a flow chart of the Start Tag Routine;

FIG. 26 illustrates an exemplary clear text SPDL document which can be converted to binary;

DESCRIPTION OF THE PREFERRED EMBODIMENTS

Figure 2:
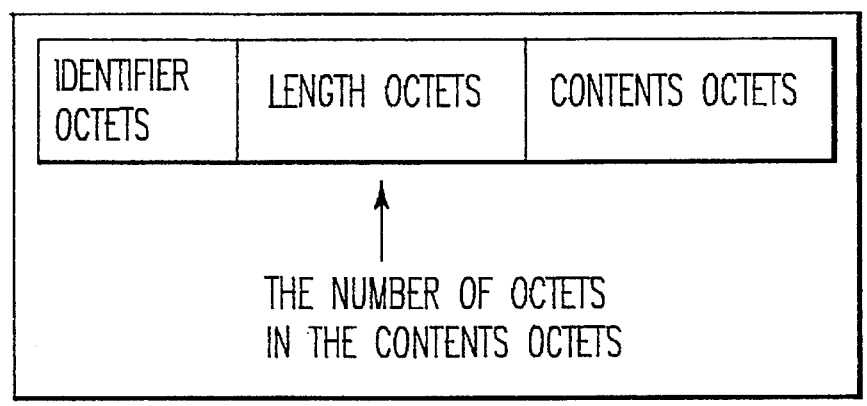
FIG. 2 illustrates the structure of an encoding according to ISO/IEC 8825.

Referring now to the drawings, wherein like reference numerals designate identical or corresponding parts throughout the several views, and more particularly to FIG. 1 thereof, there is illustrated an example of nesting of definite length and indefinite length formats for a binary encoded document. FIG. 1 can be considered to illustrate a data stream or document data stream which is to be produced. Lines 1–16 and lines 17–19 are two encodings at the highest hierarchial level, although there are nested encodings within lines 1–16. The contents of the encoding of lines 1–16 is of a definite length of 400 bytes. Within those 400 bytes, first there is an indefinite length structure at lines 4–13. Within the indefinite length contents of lines 4–13 are definite length encodings of 248 bytes and 40 bytes. In addition to the indefinite length encoding at lines 4–13 of the 400 bytes of content, there is a definite length encoding at lines 14–16 containing 100 bytes of contents. Lines 17–19 of FIG. 1 contain a definite length encoding of 250 bytes in length.

The term "nesting of definite length and indefinite length formats" means that an indefinite length encoding can have as its content both an indefinite and a definite length encoding or a combination of these two encodings. This means that the definite length encoding begins before the indefinite length ends. The above term is similarly applicable to a definite length encoding containing an indefinite length encoding therein. That is, an indefinite length encoding can begin before a definite length encoding ends. Further, there can be any number of encodings of any type nested within an encoding.

As can be seen from FIG. 1, it is necessary to encode the length of a binary encoding before the appearance of the contents. Therefore, it is necessary to have converted the contents from a clear text to a binary representation before the length can be calculated. However, it is not necessary to know the length of an indefinite encoding when the encoding is an indefinite length format as illustrated in the encoding from lines 4–13 of FIG. 1. The encoding "0000H" indicates the length of the indefinite encoding at line 13.

The flowcharts of the present invention illustrate the conversion to a definite length binary encoding. However, the present invention is also intended to cover an indefinite length encoding. This is easily done by inserting the appropriate known indefinite length encoding tag at the beginning of the indefinite length encoding and inserting the appropriate ending information ("0000H") at the end of the indefinite length encoding.

Turning now to the encoding required by ASN.1, FIG. 2 illustrates the structure of a binary encoding according to the Basic Encoding Rules as defined in ISO/IEC 8825. The encoding begins with one or more identifier octets, one or more length octets, followed by the contents octets.

Figure 3:
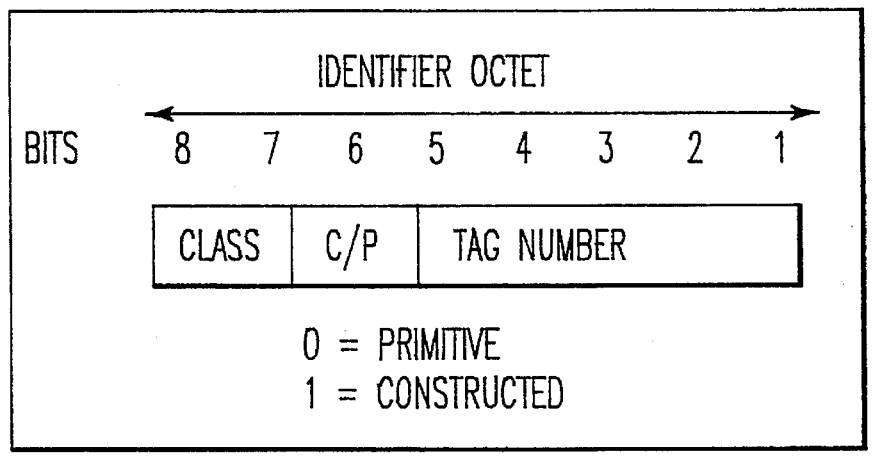
FIG. 3 illustrates the structure of an identifier octet according to ISO/IEC 8825.

The structure of an identifier octet defined by ISO/IEC 8825 is illustrated in FIG. 3. The first two bits of the identifier octet set forth the class of the encoding. The four possible classes of the encoding defined by bits 8 and 7 illustrated in FIG. 3 are universal, application, context-specific, and private. A complete description of encoding under ASN.1 can be found in ISO/IEC 8824 and 8825, each of which is incorporated herein by reference. However, an understanding of the operation of the present invention does not require an understanding of the different classes of encodings and a more detailed description is omitted for clarity.

Bit 6, illustrated in FIG. 3, determines whether an encoding is primitive or constructed. Primitive means there are no further encodings nested within the present encoding and constructed means that there are further encodings within the present encoding. Bits 5–1 illustrated in FIG. 3 pertain to the number of the tag. If the number of the tag is greater than 31, bits 5–1 are not sufficient to represent the number and therefore, the last five bits of the identifier octet are set to 11111 with subsequent identifier octets encoding the number of the tag. A complete understanding of the various tag numbers is not required to understand the operation of the present invention and is therefore omitted for clarity. Note that the identifier and length octets can be considered preamble information and the contents octets can be considered content information.

The above description is believed to be sufficient for one of ordinary skill in the art to understand the principals of binary SPDL encoding. However, a more detailed and thorough explanation of processing of a binary encoding can be found in commonly owned co-pending U.S. patent application 08/066,383 entitled "METHOD AND SYSTEM FOR PROCESSING MIXED BINARY LENGTH ENCODINGS CONTAINING DEFINITE AN INDEFINITE LENGTH FORMATS", now U.S. Pat. No. 5,436,627 which is incorporated herein by reference. However, the primary concern and processing of the present application is to convert a file from a clear text to a binary representation whereas the processing described in the related applications is primarily concerned with the presentation of a document by a printer, CRT, or the like.

The present invention uses an element table and sub-element linked list data structures to keep track of the information of the various SPDL elements. SPDL is a hierarchically structured page description language and it was necessary to determine the hierarchy in SPDL to create the information in the element tables and sub-element link lists.

Figure 4:
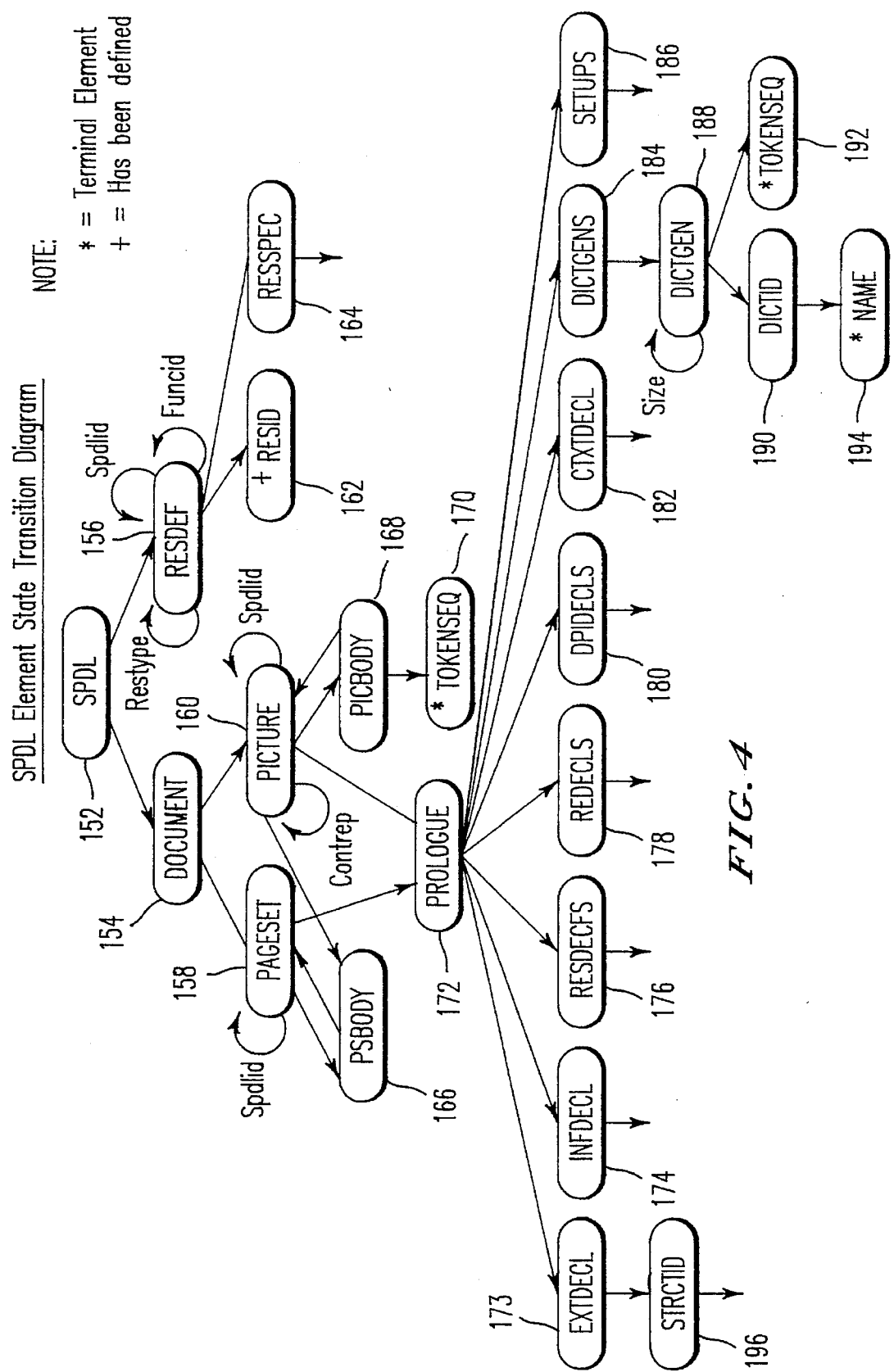
FIG. 4 is a partial illustration of an SPDL element state transition diagram.

To determine the order of the hierarchy in SPDL, the present inventors have constructed an SPDL element state transition diagram, as illustrated in FIG. 4, using the description of the SPDL elements contained in the draft standard. FIG. 4 illustrates the hierarchy of the SPDL structure elements using the tree structure contained therein and illustrates the attributes for the various SPDL elements by showing a labeled circular arrow for the attribute originating from an element and returning to that same element. From the state transition diagram, the inventors were able to create the element table and sub-element link list used by the present invention.

The first element in the transition diagram is SPDL 152. There are two possible elements which can appear under the SPDL element; the document element 154 and the resource definition element 156. The resource definition element 156 is illustrated as having attributes; the resource attribute, the SPDL ID attribute and the function ID. Attributes can have either fixed values or values input by the user.

In FIG. 4, the terminal elements or the lowest elements in a particular hierarchy have been marked with an asterisk and the elements which have been previously defined are marked with a plus sign. The terminal elements can be at the lowest level in a particular hierarchy whereas the other elements cannot. The SPDL element state transition diagram illustrated in FIG. 4 is not a complete diagram and omits some of the SPDL structure elements for clarity sake. For example, there are structure elements which appear under the resource specification 164, the structure ID element 196 having the External Declaration as its superior element, the informative declaration 174, the resource definitions 176, the resource declarations 178, the DPI declarations 180, the context declaration 182, and the set-up procedures 186.

Under the document structure element 154 are a pageset element 158 and a picture element 160. Under the pageset 158 are the pageset body 166 and the prologue 172. As is illustrated in FIG. 4, a picture element 160 can also appear under the pageset body 166. The picture element 160 has an attribute of the content representation (referred to as content type in previous related applications) and the SPDL ID. SPDL elements which can appear under the picture element 160 are the prologue 172 and the picture body 168. A token sequence 170 can appear under the picture body 168. The dictionary generators 184 appearing under the prologue 172 can have the dictionary generator element 188 appearing thereunder which has an attribute of size. The SPDL structure element which can appear under the dictionary 188 are a dictionary ID 190, a name 194, and a token sequence 192.

Note that FIG. 4 does not reflect the most recent changes to SPDL and that there are 29 places at which the STRCTID element can occur. FIG. 4 has been provided as background information and an accurate up-to-date SPDL Element State Transition Diagram could be constructed by one skilled in the art using known and available descriptions and information about SPDL. However, FIG. 4 has been provided as an example of what a state transition diagram could look like.

FIG. 5A illustrates an exemplary binary SPDL document in a hexadecimal representation. The clear text equivalent of the .document illustrated in FIG. 5A is illustrated in FIG. 5B. When the present invention is operated, the document illustrated in FIG. 5B can be input and converted to the form illustrated in FIG. 5A. Note that FIGS. 5A, 5B and 6 pertain to an earlier draft of the SPDL standard and therefore, some of the element names may be different from the names contained in the latest draft. However, this does not matter as the purpose of these Figures is to illustrate the correspondence between clear text and binary documents. Details of FIGS. 5A and 5B will be better understood after the description of the operation of the invention.

FIG. 6 illustrates how the document illustrated in FIG. 5A corresponds to the document illustrated in FIG. 5B. As can be seen from FIG. 6, 61 represents the element pageset. After 61, 59 represents the length of the pageset. Within the pageset is the SPDL ID represented by the ASN.1 tag 06. The length of the SPDL ID is 4. The actual SPDL ID which is "ISO/IEC 10180//SPDL" is represented by "28 CF 44 00".

Next in FIG. 6, it can be seen that the ASN.1 tag 44 corresponds to a comment. The length of the comment is 1F. The content of the comment is "SPDL ID=Public Object ID value". Next it is seen that A1 represents a psbody, also referred to as a pageset body. The remaining portion of FIG. 6 can be read as was done above. Therefore, a complete description of the correspondence in FIG. 6 has been omitted for brevity.

Figure 7:
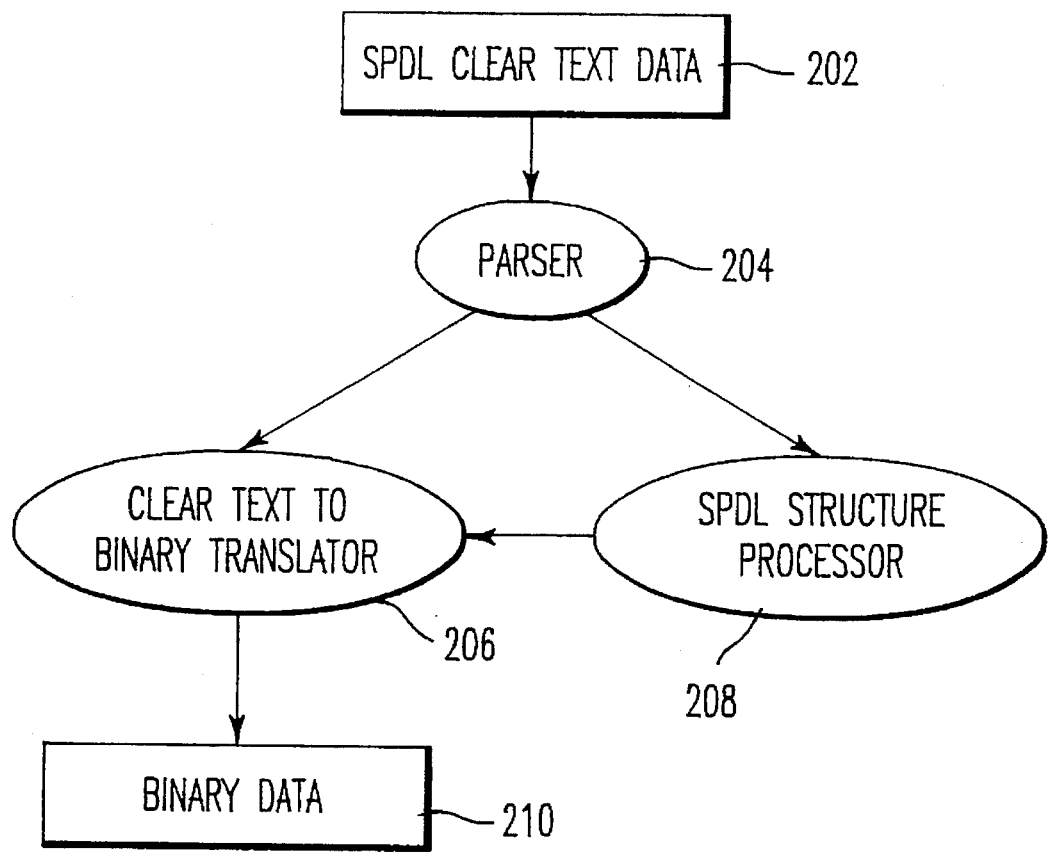
FIG. 7 is a conceptual diagram of the components used to translate a clear text document to a binary document.

FIG. 7 illustrates a conceptual arrangement used to convert a clear text input file to a binary output file. Clear text data 202 is parsed by parser 204. The parsing is performed using conventional known parsing mechanisms and a description thereof is omitted for brevity.

The parsed clear text data is transmitted to a clear text to binary translator 206 and an SPDL structure processor 208. It is necessary for the clear text to binary translator to know certain information of the SPDL structure and this information is provided by the SPDL structure processor 208. The SPDL structure processor is used to keep track of external declarations which are also referred to as structure identifications (the STRCTID clear text tag) in later drafts of the SPDL draft standard and is used to keep track of information such as the structure ID and the structure type. The clear text to binary translator 206 outputs a binary representation of the file as binary data 210.

Figure 8:
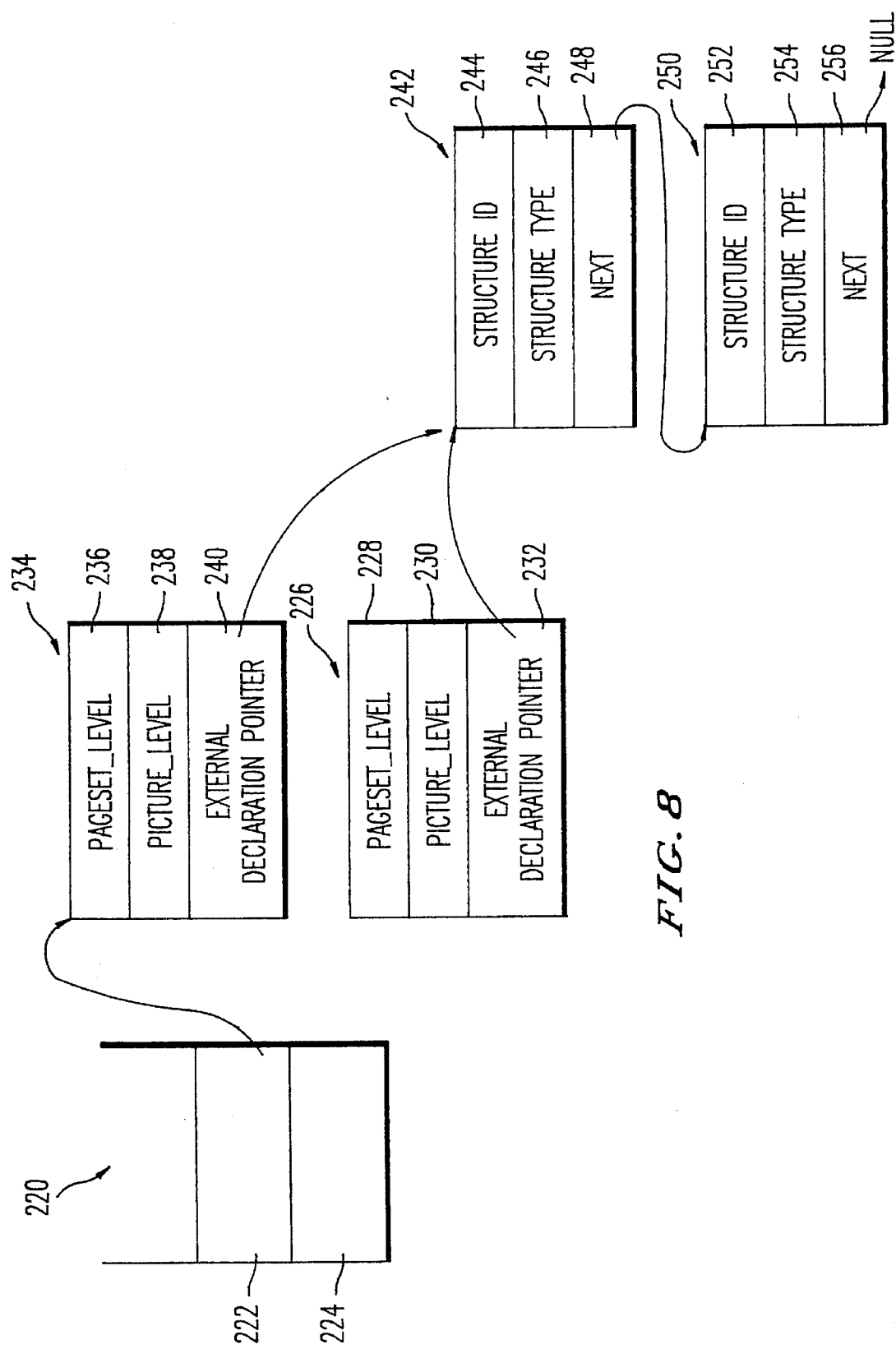
FIG. 8 is a diagram of the data structures used by the SPDL structure processor to process the STRCTID element in order to determine which binary representation will be used for the binary representation of the STRCTID element.

FIG. 8 illustrates the data structures used for the actual processing of a document by the SPDL structure processor 208 of FIG. 7. The use of the data structures in FIG. 8 is completely described in U.S. patent applications 07/876,251 and 07/876,601, now U.S. Pat. Nos. 5,325,484 and 5,319,748, respectively, both filed Apr. 30, 1992 and entitled "METHOD AND SYSTEM TO HANDLE INCLUSION OF EXTERNAL FILES INTO A DOCUMENT PROCESSING LANGUAGE", and "METHOD AND APPARATUS TO MANAGE PICTURE AND PAGESET FOR DOCUMENT PROCESSING", respectively, both of which are now allowed and incorporated herein by reference. It is to be noted that the applications of which this application is a continuation-in-part refer to an External Declaration which is the SPDL structure element pertaining to external files to be included during processing. However, a newer draft version of the SPDL standard names the structure element STRCTID instead of an element EXTID in an external declaration as the element name but the function performed by the various data structures illustrated in FIG. 8 of the present application and U.S. Pat. Nos. 5,325,484 and 5,319,748 are similar. It is further noted that a more advanced processing mechanism described in co-pending U.S. patent application 08/087,571, filed Jul. 2, 1993, now pending, and entitled "METHOD AND SYSTEM TO HANDLE CONTEXT OF INTERPRETATION IN A DOCUMENT PROCESSING LANGUAGE", which is incorporated herein by reference can alternatively be used to process the structure and content.

The picture/pageset stack 220 in FIG. 8 is used for keeping track of the various hierarchical levels of a document. The first hierarchical level in the document corresponds to pointer 224 in the picture/pageset stack 220 which points to a linked list data structure 226. The data structure 226 is used to keep track of the pageset level 228 and the picture level 230. Additionally, the data structure 226 contains an external declaration pointer 232 which points to a structure ID linked list data structure 242 which is used to keep track of the structure ID and structure type relating to the STRCTID tag, also referred in an external declaration. During the processing of SPDL structure, if a second STRCTID element is encountered during the processing of a hierarchical level, an additional structure ID linked list data structure is inserted between the data structure 226 and the data structure which was previously pointed to by the external declaration pointer 232. For example, if the external declaration pointer 232 pointed to structure ID linked list data structure 250 and a subsequent STRCTID structure element is encountered in the SPDL document, the structure ID linked list data structure 242 will be inserted between the data structure 226 and the data structure 250.

When a subsequent hierarchical level of the document is encountered, an additional entry 222 will be pushed onto the picture/pageset stack 220. Additionally, a new data structure 234 is created which will have the same external declaration pointer 240 as the external declaration pointer 232.

Figures 9, 10:
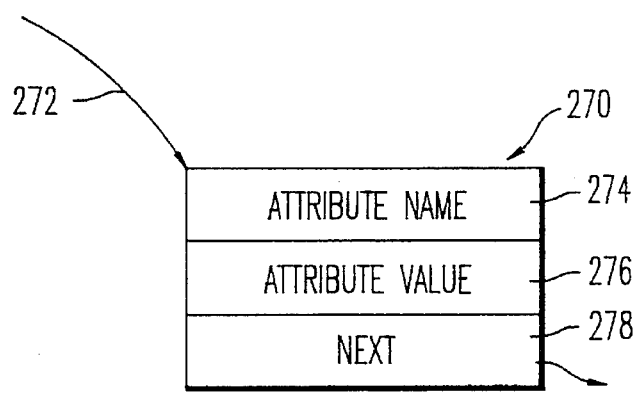
FIG. 9 is an illustration of the temporary attribute buffer data structure used to ensure that the order of the attribute in the binary converted document is proper.
FIG. 10 illustrates the element table which is used for storing various parameters for each of the clear text tags.

FIG. 9 illustrates the temporary attribute buffer data structure which is used by the conversion process of the present invention. An attribute is a sub-element of an element which defines characteristics of the element. The order of the attributes appearing in the SPDL clear text document may be different from the order of attributes which are required for the converted binary document. As each attribute of the clear text document is being processed and converted, the attributes are written into a temporary attribute buffer data structure. As subsequent attributes are encountered for an element, an additional temporary attribute buffer data structure 270 is created which is pointed to by the next pointer 278 of a previously created temporary attribute buffer data structure. Once all attributes for an element are finished being converted, the temporary attribute buffer data structure linked lists are compared with the required order for a binary document and if there are differences in the orders, the temporary attribute buffer data structures are reordered to the correct order. The first temporary attribute buffer data structure is pointed to by a temporary attribute pointer 272. The temporary data structure 270 has an entry for the attribute name 274 and an entry for the attribute value 276. Examples of attributes will be set forth with respect to the sub-element linked list data structures illustrated in FIGS. 11B–11G.

The element table illustrated in FIG. 10 is used by the conversion process of the present invention. Each time a clear text tag or element of a file to be converted is encountered, this tag is looked up in the first column of the element table. Examples of the clear text tags illustrated in FIG. 10 are the ! DOCTYPE, SPDL, PICTURE, PICTBDY, TKNSEQN.

The second column of the element table pertains to the element declaration relating to ASN.1 notation. The element declaration is a description of the characteristics of the element. More particularly, the element declaration relates to the characteristics of the element and the handling of the subordinate structure elements, if any. Examples of various declarations are no declaration, octet string, printable string, choice, sequence, sequence of choice, implicit sequence. It is to be noted that a complete element table containing every clear text tag and each of the element declarations and all other information of the clear text tags can be found or constructed using in known sources including the SPDL draft standard.

The present invention can use the element declaration to ensure that the syntax of the encoding does not violate any SPDL encoding requirements.

The third column of the element table indicates the number of attributes of an element. As previously stated, an attribute is used to describe specific features of an element. A question mark in the number of attributes column indicates it is unknown how many attributes are needed for the clear text tag, zero indicates there are zero attributes for the tag, one indicates that there is one attribute for the tag, etc.

The fourth column of the element table indicates the number of various sub-elements which can appear under the element. For example, there is only one sub-element which can appear directly below the ! DOCTYPE element or clear text tag. There are 25 different types of sub-elements which can appear under the SPDL tag.

The fifth column in the element table is a pointer to the sub-element linked lists. These linked lists contain information pertaining to the sub-elements which can appear under the element. The TKNSEQN tag does not have any sub-elements appearing thereunder and therefore its pointer to the sub-element linked list data structures points to null.

Figure 11A:
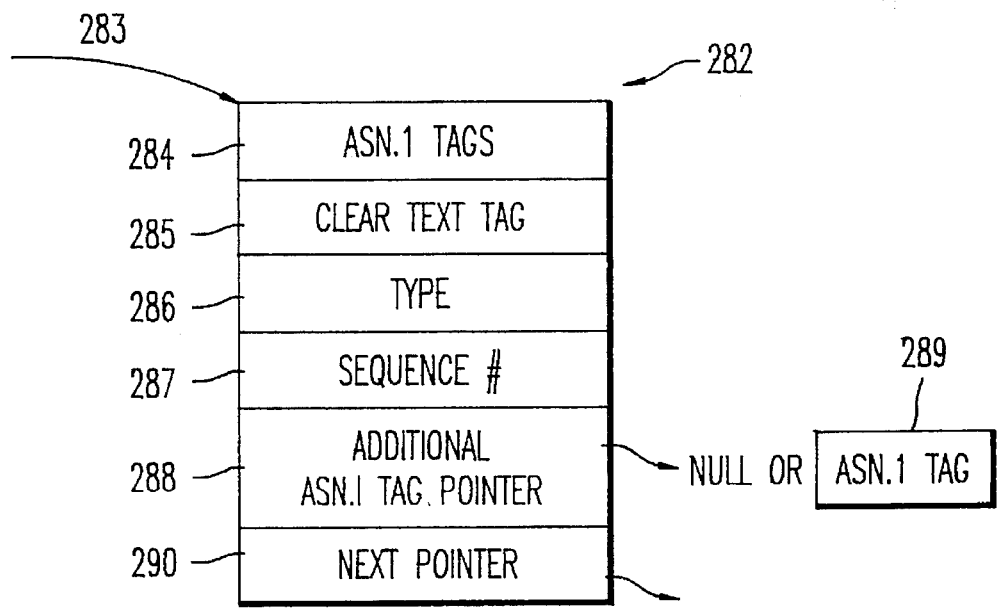
FIGS. 11A illustrates the fields of the sub-element linked list data structure.

FIG. 11A illustrates a sub-element linked list data structure 282. These data structures are pointed to or referred to by a pointer to sub-elements in the element table illustrated in FIG. 10 or can be referred to by a next pointer of a different sub-element linked list data structure.

The sub-element linked list data structure 282 illustrated in FIG. 11A has a first field 284 which contains one or more ASN.1 tags which contain a binary representation of a sub-element. The second field 285 contains the clear text representation of the sub-element. The third field is the type field 286 which indicates the type of sub-element; the type can be a tag or an attribute, which may be abbreviated as ATT.

The sequence No. entry 287 indicates where the sub-element must appear after the element when the sequence is important in the binary encoding. For example, if the sequence No. is 1, if the sub-element appears after the element, it must be the first sub-element appearing after the element.

Field 288 contains a pointer to an additional ASN.1 tag. Certain SPDL elements require more than one binary tag and for these elements, pointer 288 will point to an additional ASN.1 tag 289. Otherwise, pointer 288 will point to null.

Certain sub-elements of an element are related in that they have the same additional ASN.1 tag. This additional ASN.1 tag must appear the first time one of the related sub-elements is converted but is not to appear for subsequent related sub-elements which have the same ASN.1 additional tag. However, the first field of the sub-element link list, the ASN.1 tags field, is always to appear for the representation of the sub-element. Related to the additional ASN.1 tag pointer of the sub-element linked data structure is the additional tag flag found in the length control stack illustrated in FIG. 12. This additional tag flag is equal to yes for entries in the length control stack which are additional tags. Otherwise, the additional tag flag is equal to no. Further explanation of the length control stack illustrated in FIG. 12 will be given with respect to the flow charts illustrated in the drawings.

The last entry of the sub-element linked list data structure 282 is the next pointer 290 which points to a subsequent sub-element linked list data structure. If there is more than one possible sub-element for a given element, each sub-element will have its own sub-element linked list data structure and the next pointer of the first sub-element linked list data structure will point to the sub-element linked list data structure of the second sub-element linked list data structure.

Figure 11B:
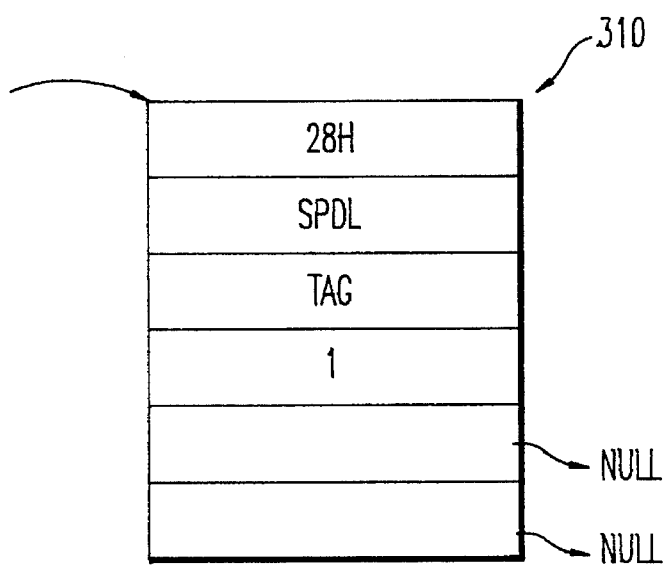

FIG. 11B illustrates the sub-element linked list data structure for the ! DOCTYPE element. This sub-element is the SPDL tag and the ASN.1 representation of SPDL is 28H. Because SPDL is the only sub-element for ! DOCTYPE, the sequence number is 1. As 28H is one tag, the additional ASN.1 tag pointer points to null. As there is only one sub-element for the ! DOCTYPE element, the next pointer of the sub-element link list data structure for the SPDL sub-element also points to null.

Figure 11C:
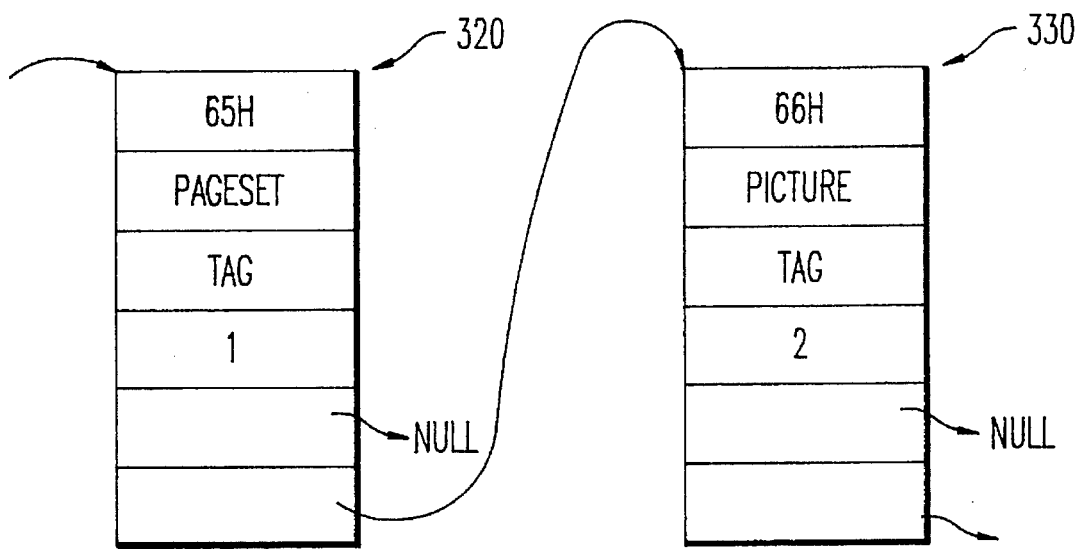

The SPDL element has sub-elements; the first being the pageset and the second being the picture, as can be seen in FIG. 11C. The sub-elements are contained in the data structures 320 and 330 respectively.

The picture element contains the first sub-element CONTREP which refers to the content representation, and was formerly referred to as content type in earlier drafts of the SPDL standard. This sub-element is contained in the data structure 340 illustrated in FIG. 11D. The second sub-element of the picture element is the PICTBDY whose information is contained in the data structure 350.

Figure 11D:
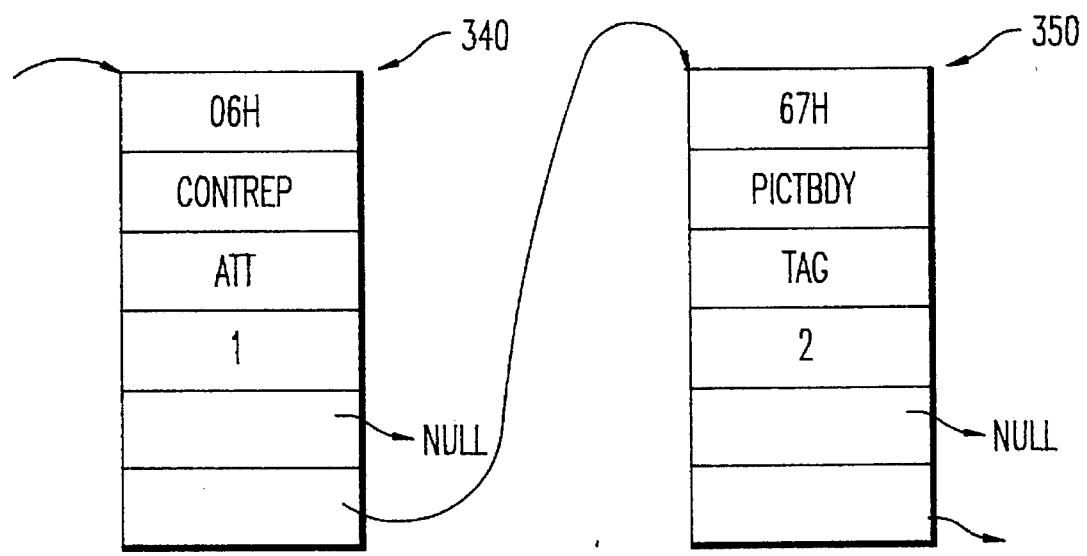

It is to be noted that for the SPDL element and the picture element, there are 29 and 4 possible sub-elements, respectively, as shown in the element table illustrated in FIG. 10, but each of these sub-elements has not been illustrated in FIGS. 11C and 11D for the sake of brevity. However, it is possible for one to construct these sub-element linked list data structures using known information about SPDL.

Figure 11E:
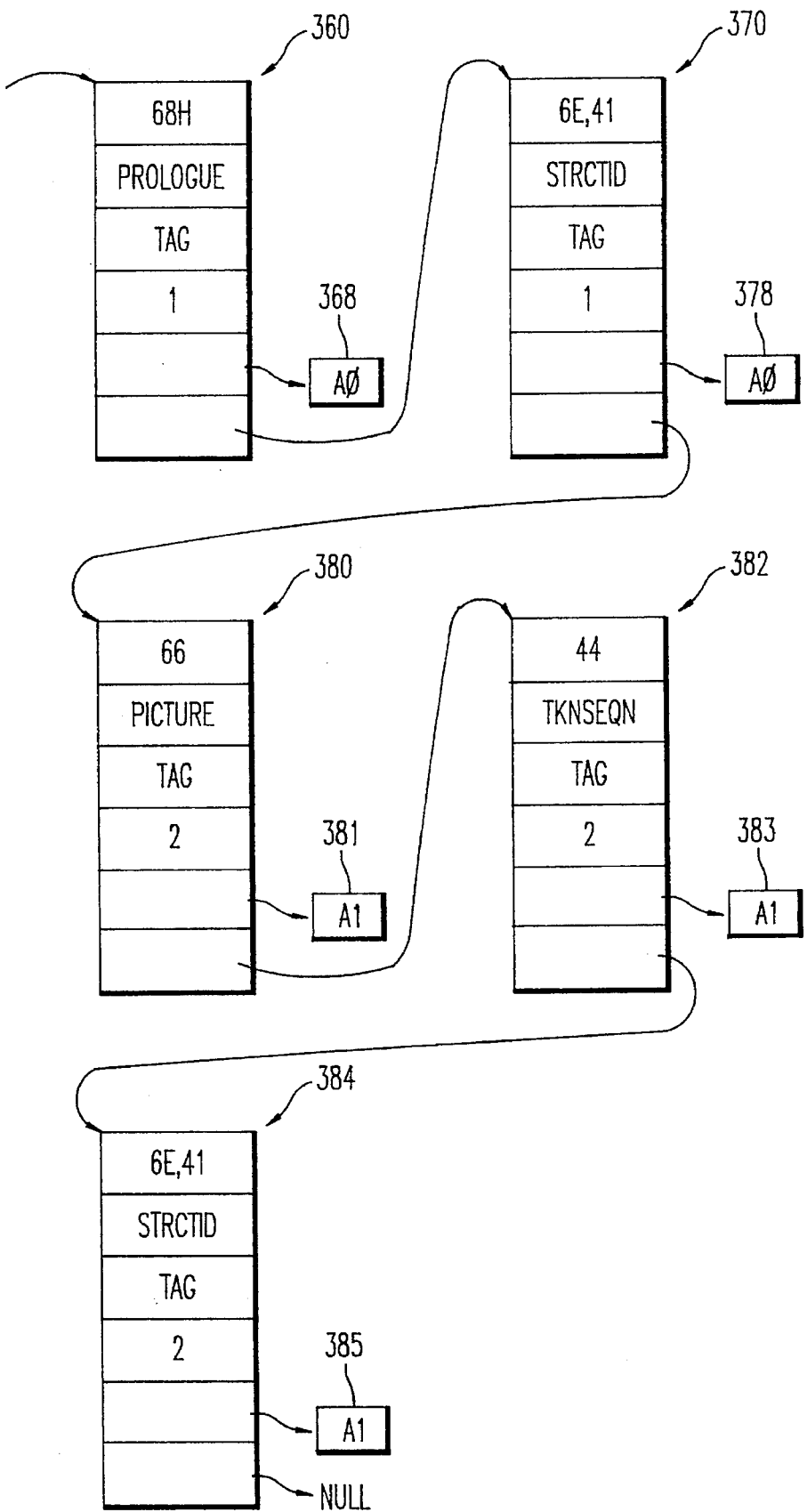

FIG. 11E illustrates the possible sub-elements for the PICTBDY element. The first possible sub-element is the prologue contained in the data structure 360. As there are two tags necessary to represent prologue, the ASN.1 tags field is 68H and the additional ASN.1 tag pointer points to the AOH tag 368. The other sub-elements for the PICTBDY element are the STRCTID in the sub-element linked list 370, the PICTURE in data structure 380, the token sequence in data structure 390 and the STRCTID appearing again in data structure 400.

As can be seen from FIG. 11E, the STRCTID sub-element under the PICTBDY element can have two different binary representations; the first being AO 6E 41 from the data structure 370 and the second being A16E 41 from the data structure 384. These different binary representations depend on specific information of the STRCTID clear text tag appearing in the document to be converted, which is also referred to as an external declaration in previous drafts of the SPDL standard. A more complete explanation of the use of the different STRCTID sub-elements will be given with respect to the flow charts.

Figure 11F:
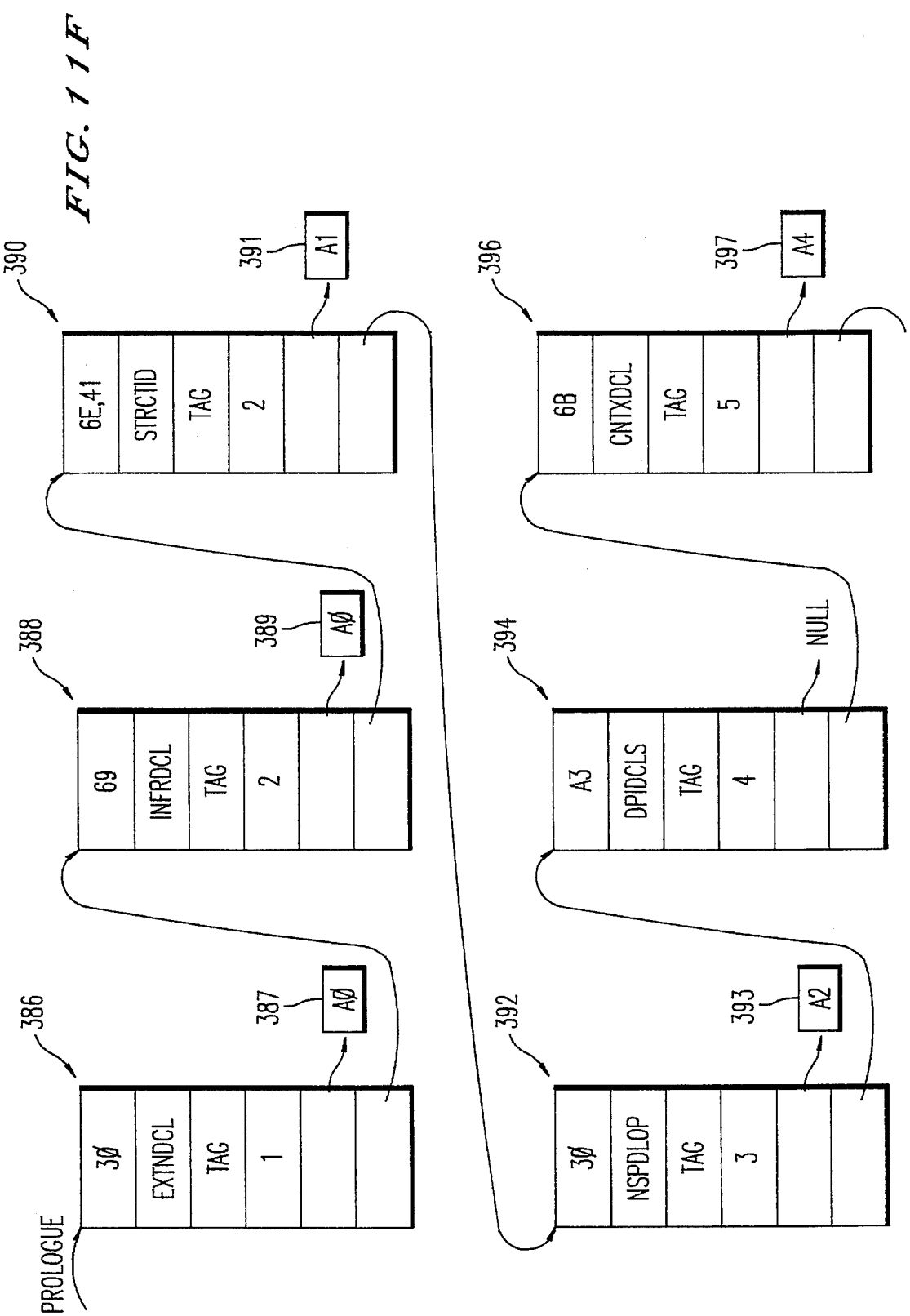

FIG. 11F and 11G illustrate the sub-element linked list for the PROLOGUE element. The line extending from the last field of data structure 396 in FIG. 11F points to data structure 398 illustrated in FIG. 11G. FIGS. 11F and 11G have been constructed using known information about SPDL and are not a complete illustration of the sub-element linked list but end with data structure 408 due to the numerous possible sub-elements which can appear under the PROLOGUE element. However, if desired, a complete PROLOGUE sub-element linked list data structure can be constructed using known sources of information pertaining to SPDL.

Figure 12:
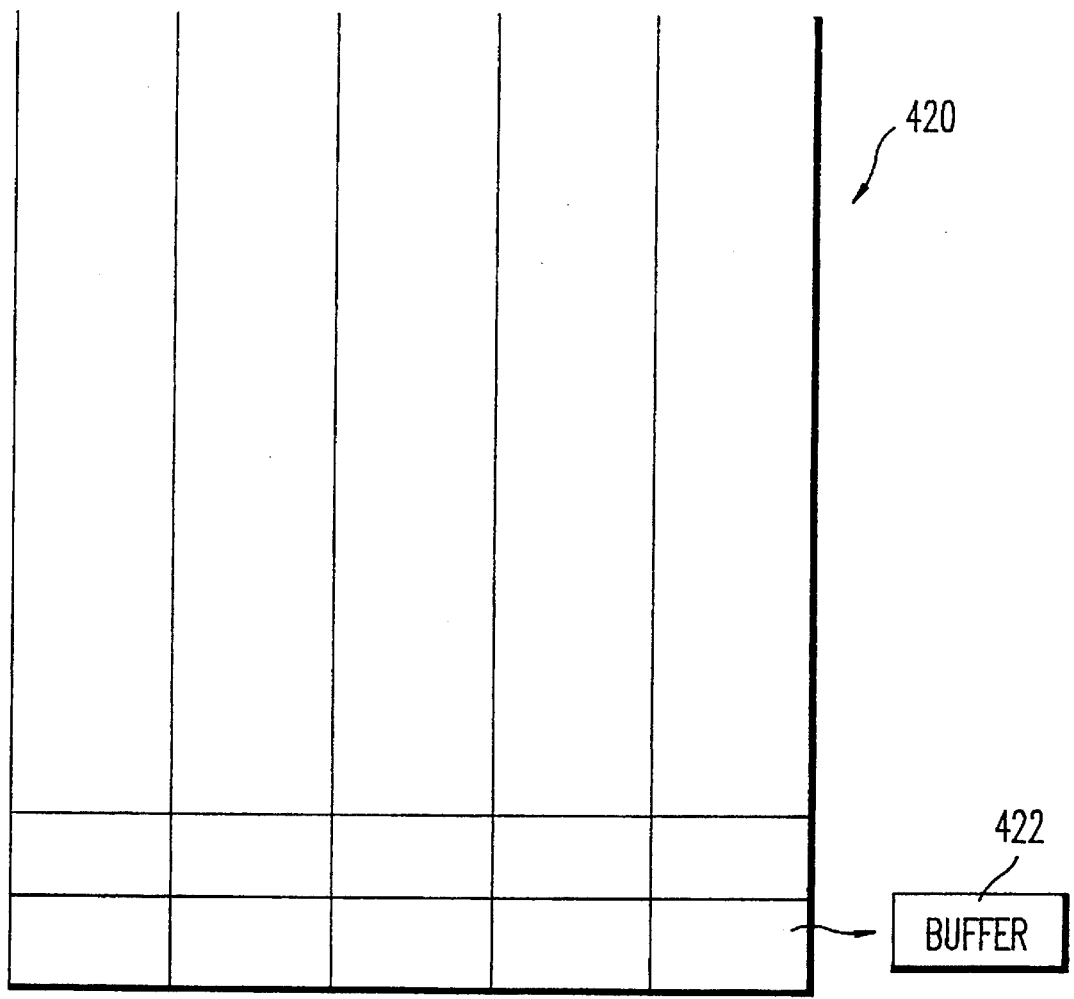
FIG. 12 illustrates the length control stack which is used to keep track of the conversion of each of the hierarchical levels of the document.

FIG. 12 illustrates the length control stack 420 which is used as an SPDL clear text document is being converted to binary. The first element being processed will be at the bottom of the stack and is usually the SPDL tag. The clear text tag appears in the first column which is the element name. The second column of the stack is the ASN.1 tag value which is the binary representation of the clear text element name. The third column of the stack is the buffer count which indicates the number of bytes currently in the buffer 422 which is referred to by the buffer pointer. The additional tag flag indicates that the tag contained in the length control stack is the additional ASN.1 tag from the sub-element linked list data structure. This information is used when processing later sub-elements to determine if the additional ASN.1 tag for the later sub-elements, if in existence, is to be used in the binary representation of the clear text element.

Figure 13:
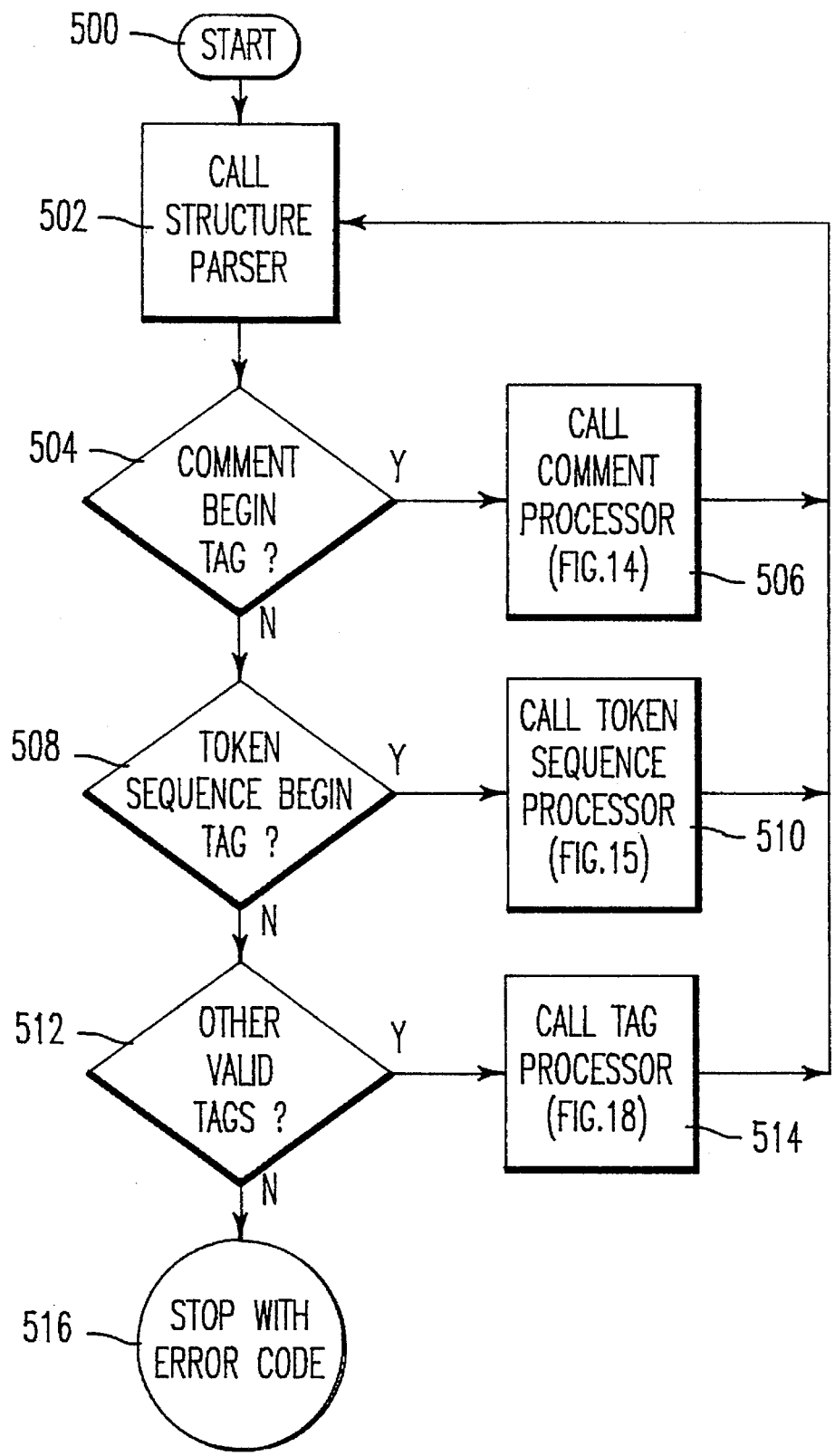
FIG. 13 illustrates a flow chart used for the conversion process.
Figure 14:
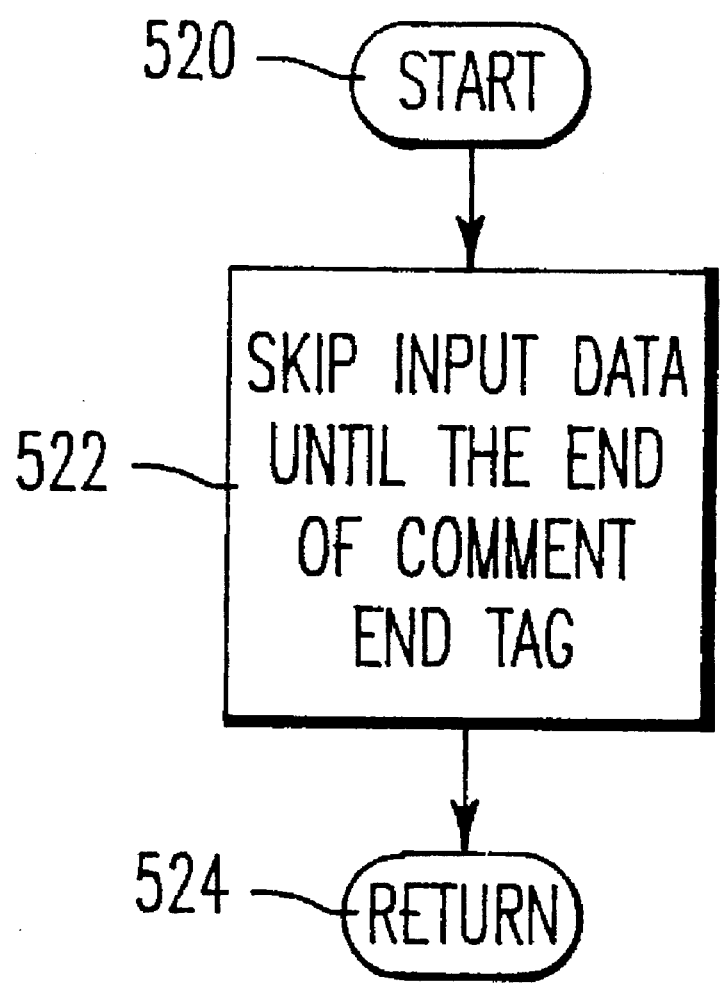
FIG. 14 illustrates the process used by the Comment Processor.

The operation of the invention will now be described with respect to the flow charts illustrated in FIGS. 13–24. In FIG. 13, the process begins in step 500 and step 502 calls a structure parser. The parsing is performed by known and conventional parsing mechanisms and a description thereof is omitted for brevity. In FIG. 13, there are three different processes which can be called depending on the type of clear text tag which is being processed. If the tag being processed is a comment tag and is the beginning of the comment, the Comment Processor illustrated in FIG. 14 is called in step 506. If the tag to be converted is a token sequence begin tag, flow proceeds from step 508 to step 510 which calls the Token Sequence Processor illustrated in FIG. 15. If there are other valid tags to be processed, flow proceeds from step 512 to step 514 which calls the Tag Processor illustrated in FIG. 18. If step 512 determines that there is not a valid tag to be processed, the process is terminated at step 516 which indicates an error.

It is to be noted that FIG. 13 does not contain a step which ends in a normal termination of the process. The overall process of the invention is terminated by FIG. 21 which illustrates the SPDL End Routine which will be explained later. Additionally, while steps 506, 510 and 514 refer to various processors, what is illustrated in the figures are flow charts for executing a process. Therefore, it is not necessary to have a separate physical processor which performs the processes but the processors referred to are conceptual functional elements.

The Comment Processor illustrated in FIG. 14 handles the processing of comment tags. In FIG. 14 step 522 indicates that input data is to be skipped until the end of the comment tag. Therefore, the comment information is not actually converted from clear text to binary because the comments are not needed to actually process an SPDL document. However, if it is desirable to preserve the information within the comments, the comment information can alternatively be converted to binary instead of being skipped by having the Tag Processor illustrated in FIG. 18 process the comment tag after the Comment Processor is finished executing its functions. From step 524, flow returns to the process illustrated in FIG. 13 and the structure parser is again called in step 502 to parse the next structure element.

Figure 15:
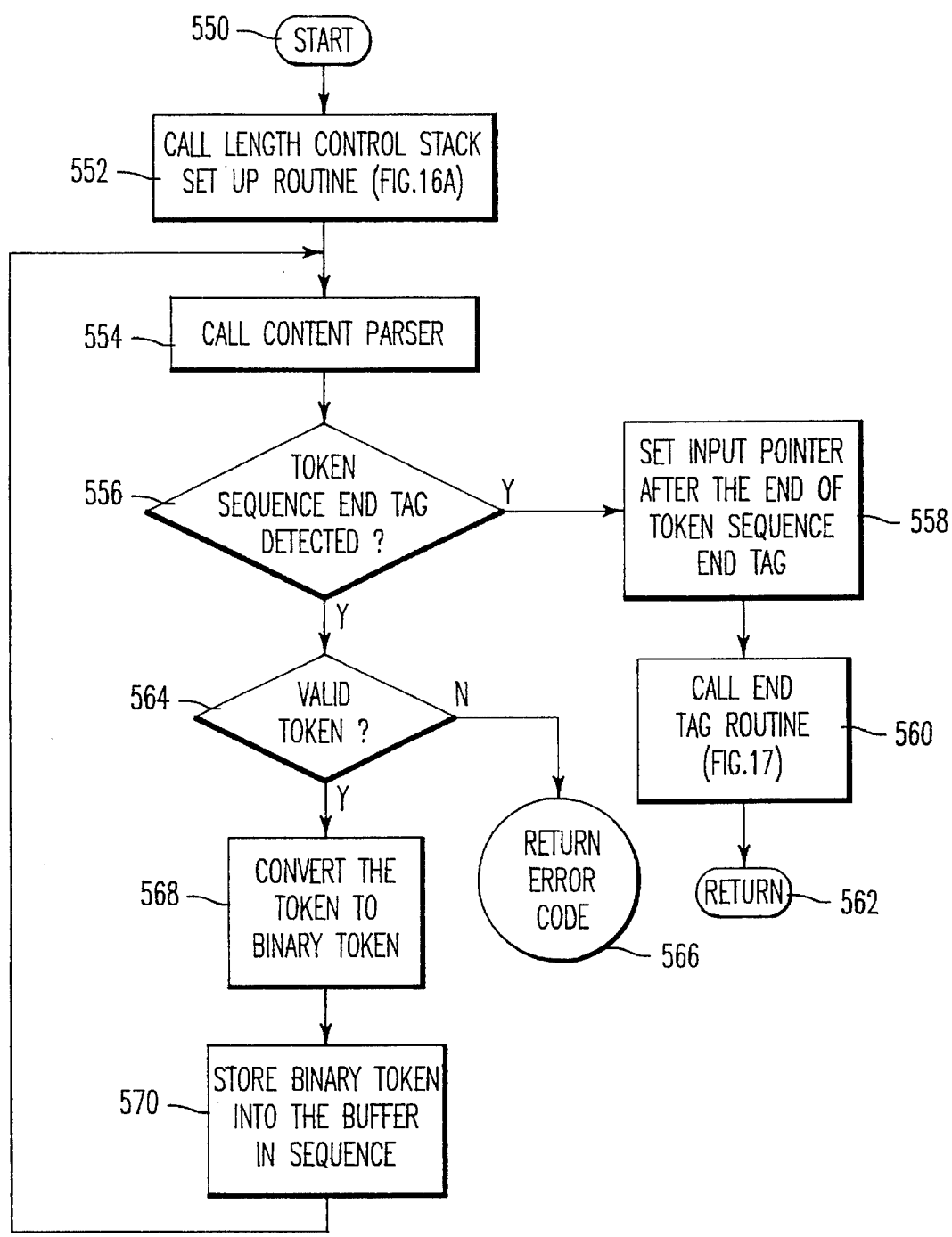
FIG. 15 illustrates a flow chart for a process used by a Token Sequence Processor.

In FIG. 13, steps 508 and 510 cause the Token Sequence Processor illustrated in FIG. 15 to be called. A token sequence is a structure element which contains the content of the document. In FIG. 15, step 552 calls the Length Control Stack Set-Up Routine illustrated in FIG. 16A (which will be described later). Next, a content parser is called in step 554 which parses the content contained within the token sequence structure element. This parsing is also performed by conventional parsing mechanisms and a description thereof is omitted for brevity.

Step 556 examines if the end of a token sequence has been detected. If it has not, step 564 examines the token sequence to determine if it is valid. If it is not, an error code is returned in step 566. If the token sequence is valid, step 568 converts the token sequence to a binary representation. Step 570 then stores the binary representation into the buffer used by the length control stack. From step 570, flow returns back to step 554. If step 556 determines that a token sequence end tag is detected, step 558 sets the input pointer to refer to the next element after the token sequence end tag. This pointer indicates the next element in the clear text input file which is to be processed. Next, step 560 calls the end tag routine illustrated in FIG. 17 which is used to process the end tag of the token sequence element. Then flow returns to FIG. 13 in step 562.

Figure 16A:
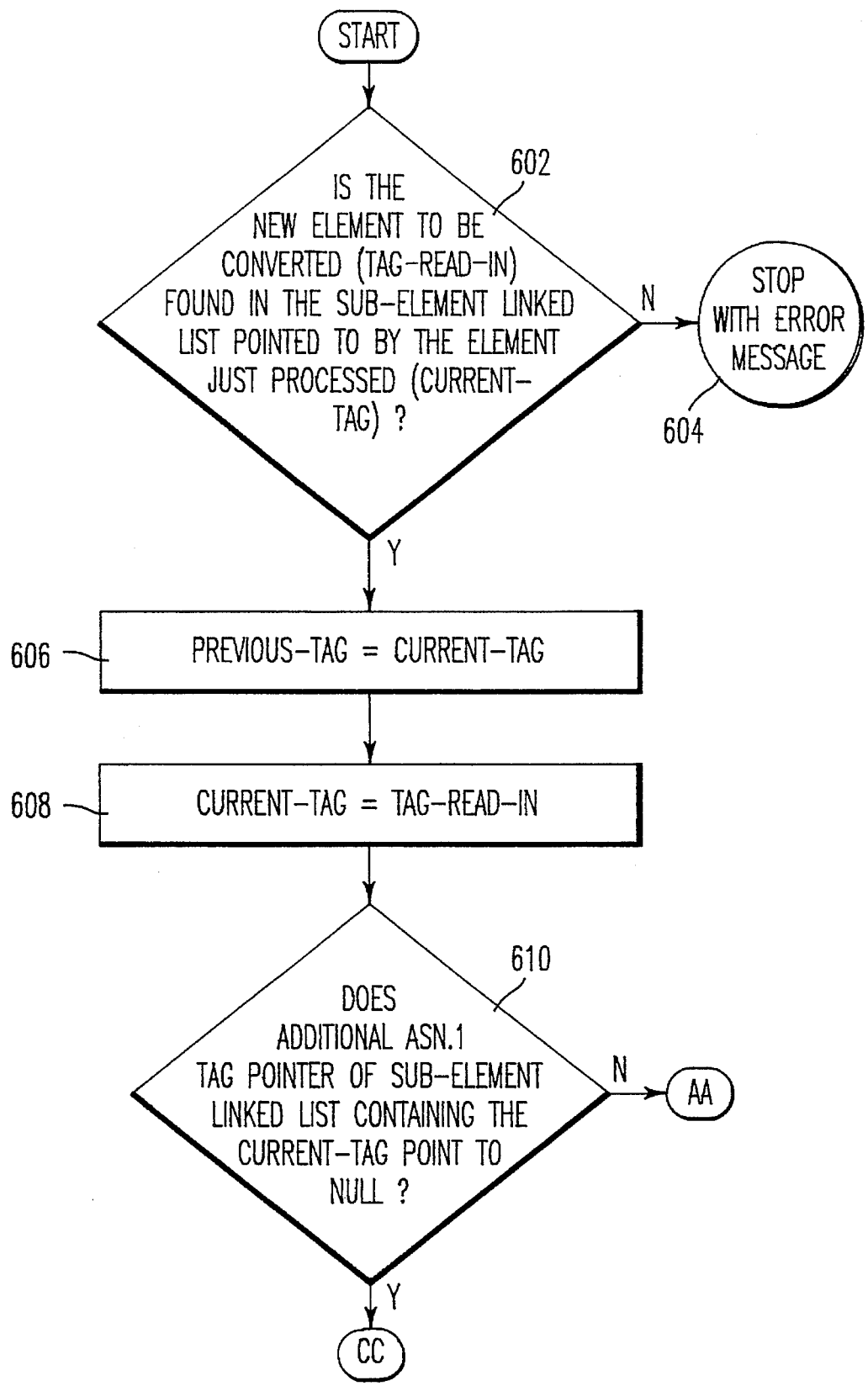
FIGS. 16A, 16B and 16C illustrate the Length Control Stack Set-Up Routine used to initialize the length control stack.
Figure 16B:
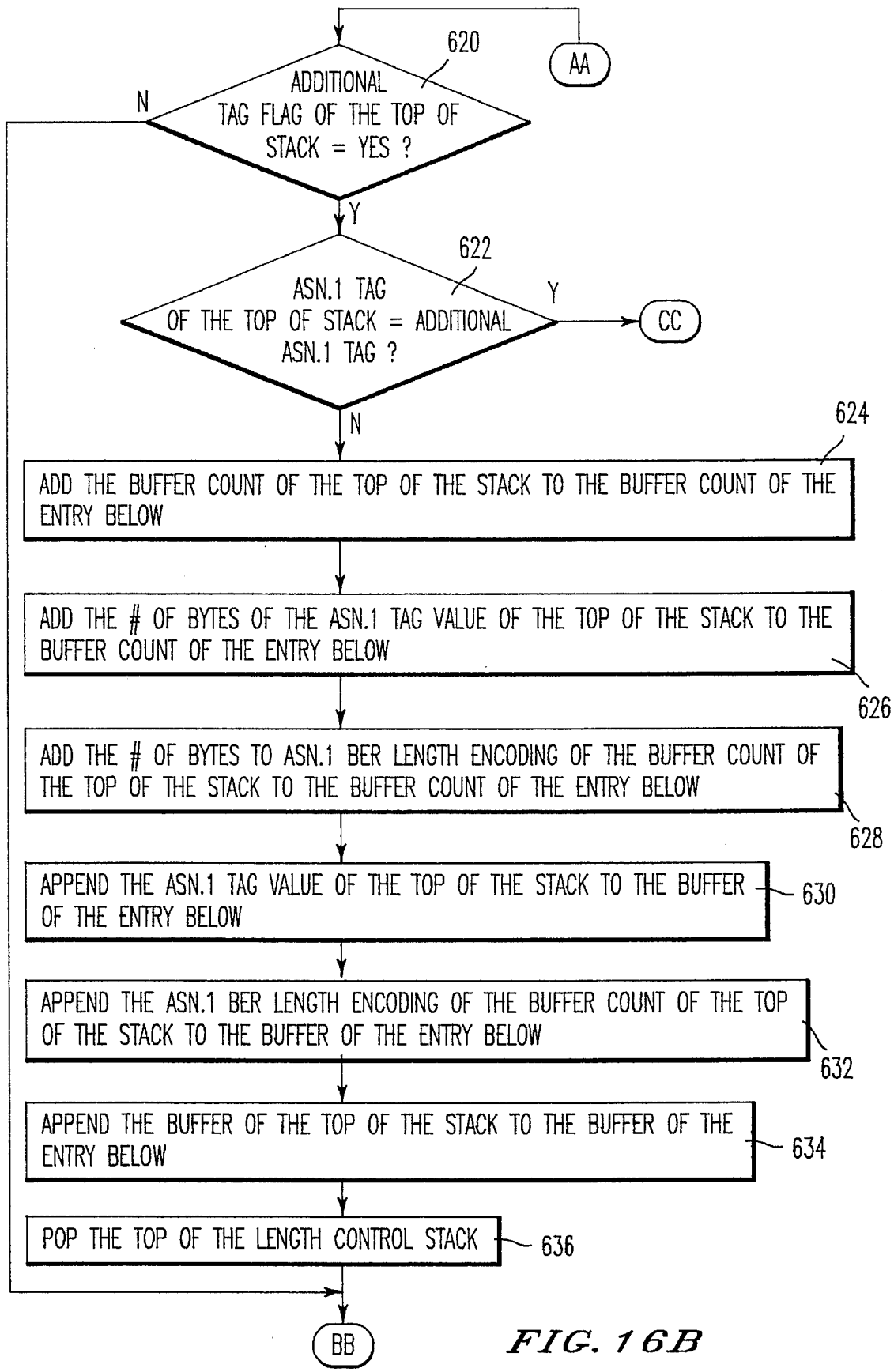
Figure 16C:
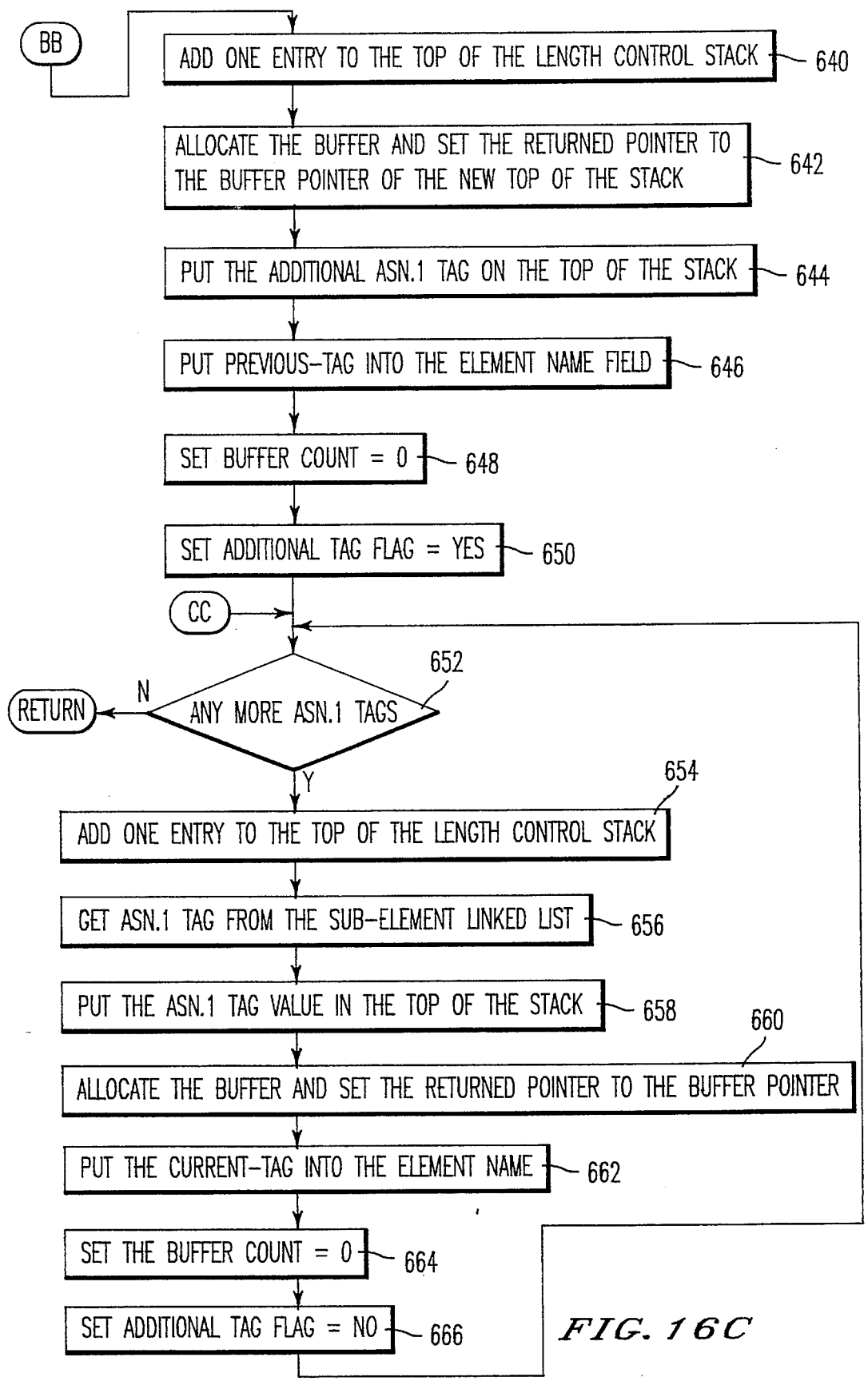

FIGS. 16A, 16B and 16C illustrate the "Length Control Stack Set-Up Routine". This routine is used to set up the length control stack illustrated in FIG. 12 each time a new clear text tag is to be converted. In the Length Control Stack Set-Up Routine, the Current-Tag is used for looking into the Element Table, the Tag-Read-In is used for looking into the sub-element linked list, and the Previous Tag is used to store the parent element of the tag being processed (Tag-Read-In).

After the length control stack set-up routine is called, step 602 of FIG. 16A determines if the new element to be converted (Tag-Read-In) is found in the sub-element linked list pointed to by the element which was just processed (the Current-Tag). If it is not, an error is indicated in step 604 because the new element to be converted is not a proper sub-element of the element which was just processed. If the new element is a proper element, step 606 sets the Previous-Tag equal to the Current-Tag. Step 608 then sets the Current-Tag equal to the tag which was just read in (Tag-Read-In).

Step 610 determines if the additional ASN.1 tag pointer of the sub-element linked list containing the Current-Tag points to null. Depending on whether or not the tag points to null, different processing is performed. If the tag does not point to null, flow proceeds to process AA illustrated in FIG. 16B. If the tag does point to null, the steps illustrated in FIG. 16B and the top portion of 16C are not performed and flow proceeds to CC illustrated in FIG. 16C.

If the additional ASN.1 tag pointer does not point to null, there is an additional ASN.1 tag referred to by the pointer and flow proceeds to process AA illustrated in FIG. 16B.

In FIG. 16B, step 620 examines if the Additional Tag Flag of the top entry of the length control stack is equal to Yes. If it is not, steps 622–636 of FIG. 16B can be omitted and flow proceeds to process BB illustrated in FIG. 16C.

If the Additional Tag Flag at the top of the length control stack is equal to yes, flow proceeds to step 622 where the ASN.1 Tag of the top entry of the length control stack is examined to see if it is equal to the tag pointed to by the additional ASN.1 tag pointer. If it is, there is no processing to be done for the additional ASN.1 tag and flow proceeds to process CC illustrated in FIG. 16C to process the ASN.1 tag(s) which is(are) contained in the top entry of the sub-element linked list. If the ASN.1 tag at the top of the stack is not equal to the additional ASN.1 tag pointed by the additional ASN.1 tag pointer of the sub-element linked list data structure, it is necessary to process the additional ASN.1 tag and flow proceeds to step 624.

Step 624 adds the buffer count of the top of the stack to the buffer count of the entry below. Step 626 adds the number of bytes of the ASN.1 tag value at the top of the stack to the buffer count of the entry below. Step 628 adds the number of bytes of the ASN.1 BER length encoding of the buffer count of the top of the stack to the buffer count of the entry below. Step 630 appends the ASN.1 tag value of the top of the stack to the buffer of the entry below. Step 632 appends the buffer of the top of the stack to the buffer of the entry below and step 636 pops the top entry off of the length control stack, thus discarding it. Flow then proceeds to process BB illustrated in FIG. 16C.

In FIG. 16C, step 640 adds a new entry to the top of the length control stack. Step 643 allocates a buffer for this new entry and sets the buffer pointer of the top entry of the stack to point to this new buffer. Step 644 puts the additional ASN.1 tag pointed to by the additional ASN.1 tag pointer into the top of the stack. Next, step 646 writes the previous-tag (the clear text SPDL name of the element of sub-element being processed) into the element name field of the top entry of the length control stack. Step 648 sets the buffer count of the top entry of the stack equal to zero and step 650 sets the additional tag flag of the top entry of the stack equal to yes.

From CC in FIG. 16A and 16B and step 650, step 652 begins the processing of the ASN.1 tags of the sub-element. The first time step 652 is encountered, there are going to be ASN.1 tags of the sub-element to be processed and flow proceeds to step 654. Step 656 gets the ASN.1 tag from the sub-element linked list. Step 658 puts the ASN.1 tag into the top entry of the stack. Step 660 allocates the buffer of the top entry of the stack and sets the pointer of the top entry of the stack to point to the buffer. Step 662 puts the Current-Tag into the element name of the top entry of the stack. Step 664 sets the buffer count of the top entry of the stack to zero and step 666 sets the additional tag flag of the top entry of the stack equal to no as the tags which are currently being processed are not additional tags but tags contained in the first field of the sub-element linked list. From step 666, flow returns to step 652 and the loop of steps 652–666 is performed until all of the ASN.1 tags of the top field of the sub-element linked list are processed. After they are all processed, flow returns to the calling process.

Figure 17:
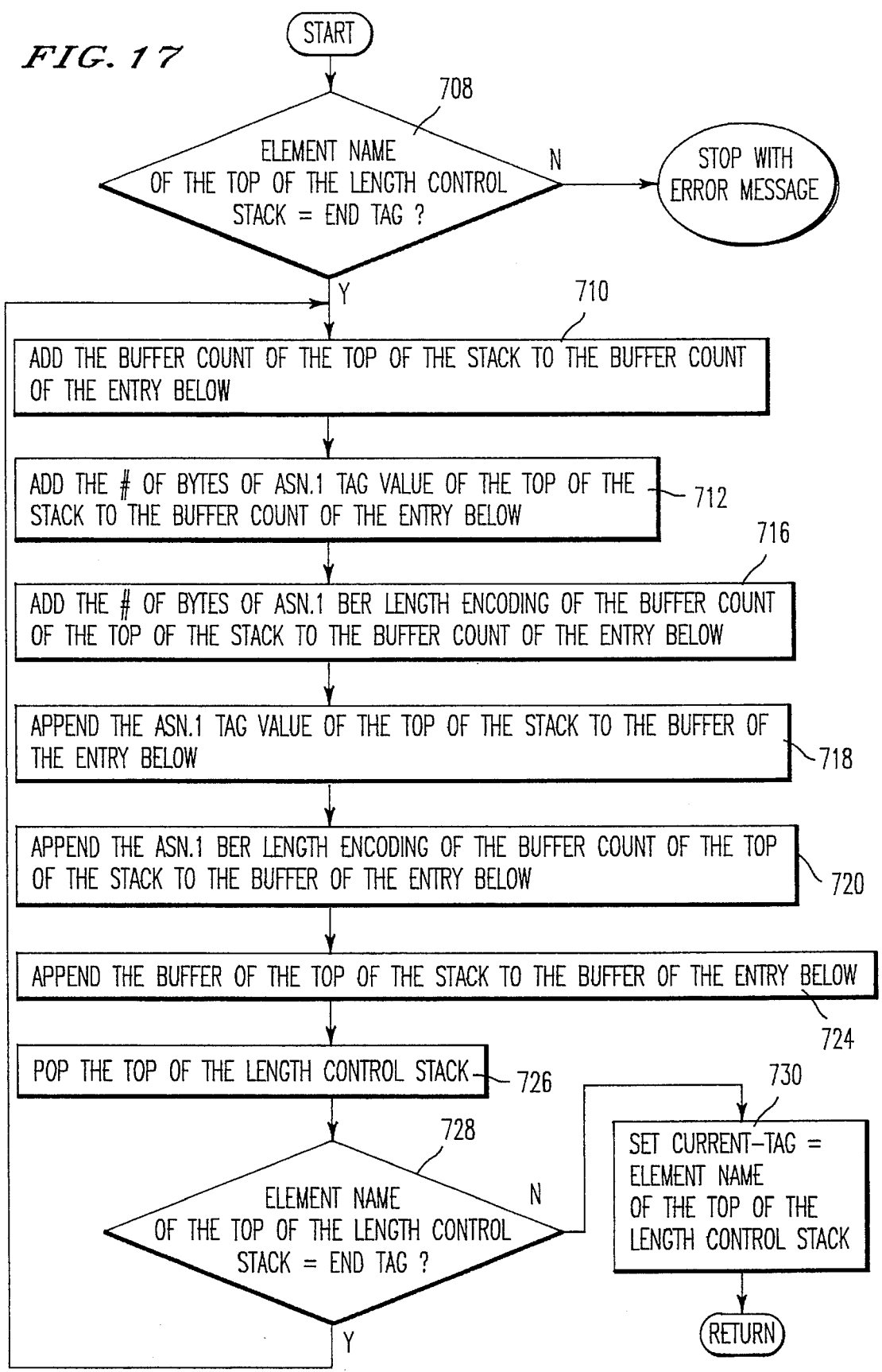
FIG. 17 illustrates a flow chart of the End Tag Routine.

FIG. 17 illustrates the "End Tag Routine" which is used to handle processing and adjust the length control stack when a clear text end tag has been reached. After starting, step 708 determines if the element name at the top of the stack is equal to an end tag. If it is not, there is an error and an error message is given. If there is, flow proceeds to step 710.

If step 708 determines that the element name at the top of the stack is an end tag, step 710 adds the buffer count of the top entry of the length control stack to the buffer count entry of the second from the top entry of the length control stack. Step 712 adds the number of bytes of the ASN.1 tag to the buffer count of the entry below. Step 716 then adds the number of bytes required to represent the length information pertaining to the length of the buffer of the top entry of the stack to the entry below. Step 718 then appends the ASN.1 tag to the buffer of the entry below. Next, the length of the buffer count of the top of the stack is added to the buffer of the entry below in step 720. The content of the buffer of the top entry of the stack is then appended to the buffer of the entry below in step 724. Step 726 pops the top entry off of the length control stack. Step 728 determines if the element name at the top of the length control stack is an end tag. If it is, flow loops back to step 710 to repeat the processing for this end tag. If it is not, flow proceeds to step 730 where the Current-Tag is set to be the element name which is at the top of the length control stack. Flow then returns to the calling process.

Figure 18:
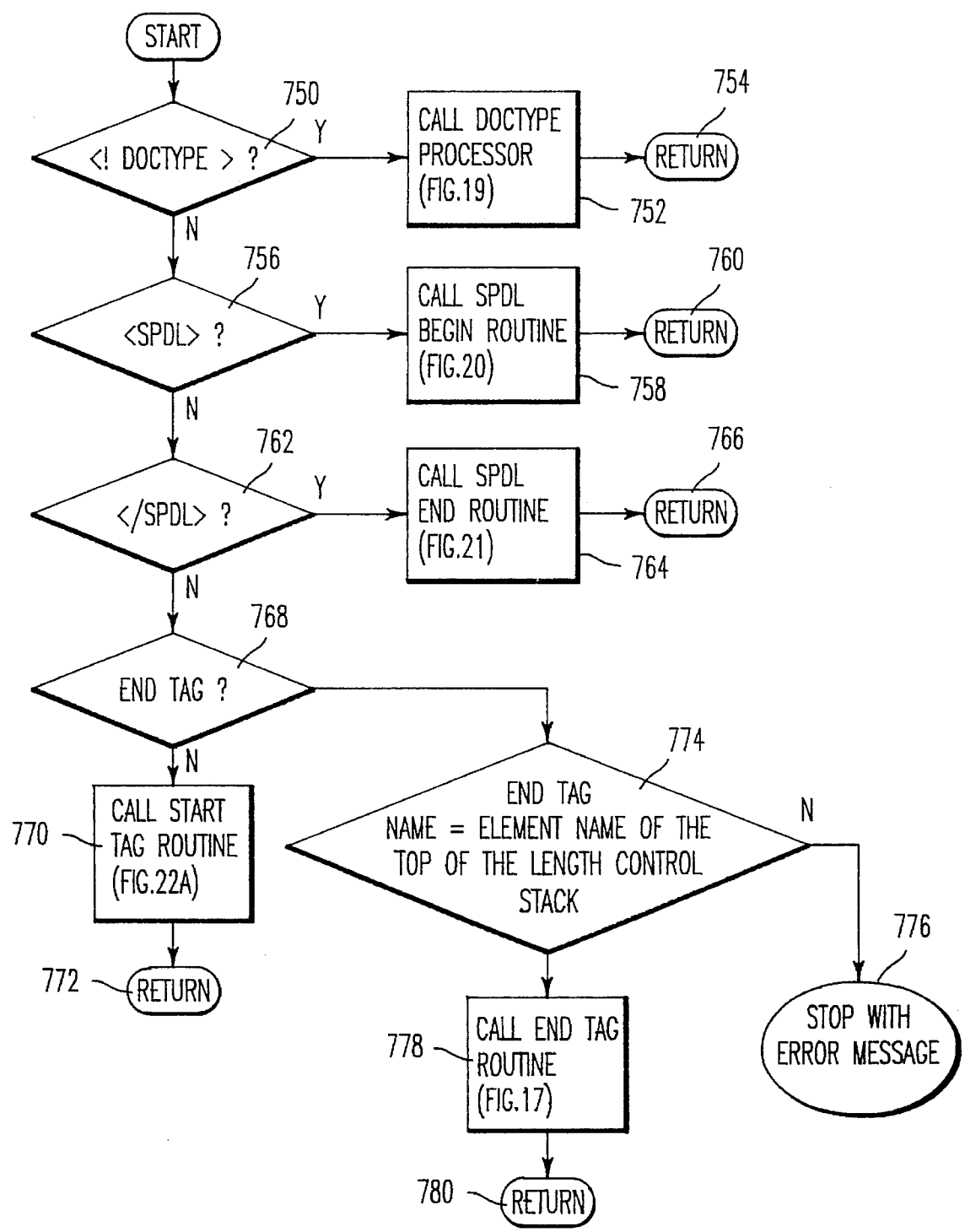
FIG. 18 illustrates a flow chart used by the Tag Processor.
Figure 19:
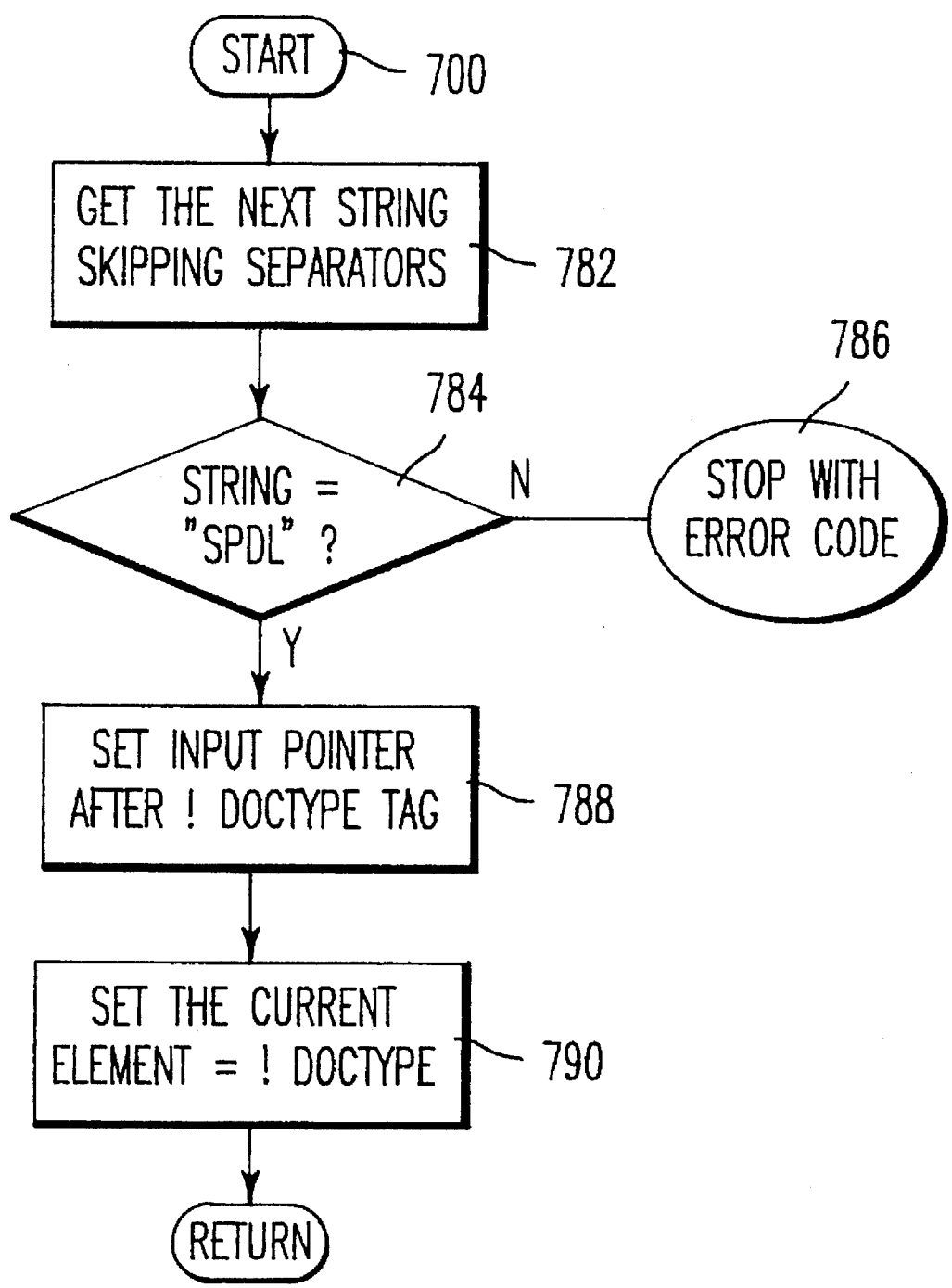
FIG. 19 illustrates a flow chart used by the DOCTYPE Processor.
Figure 20:
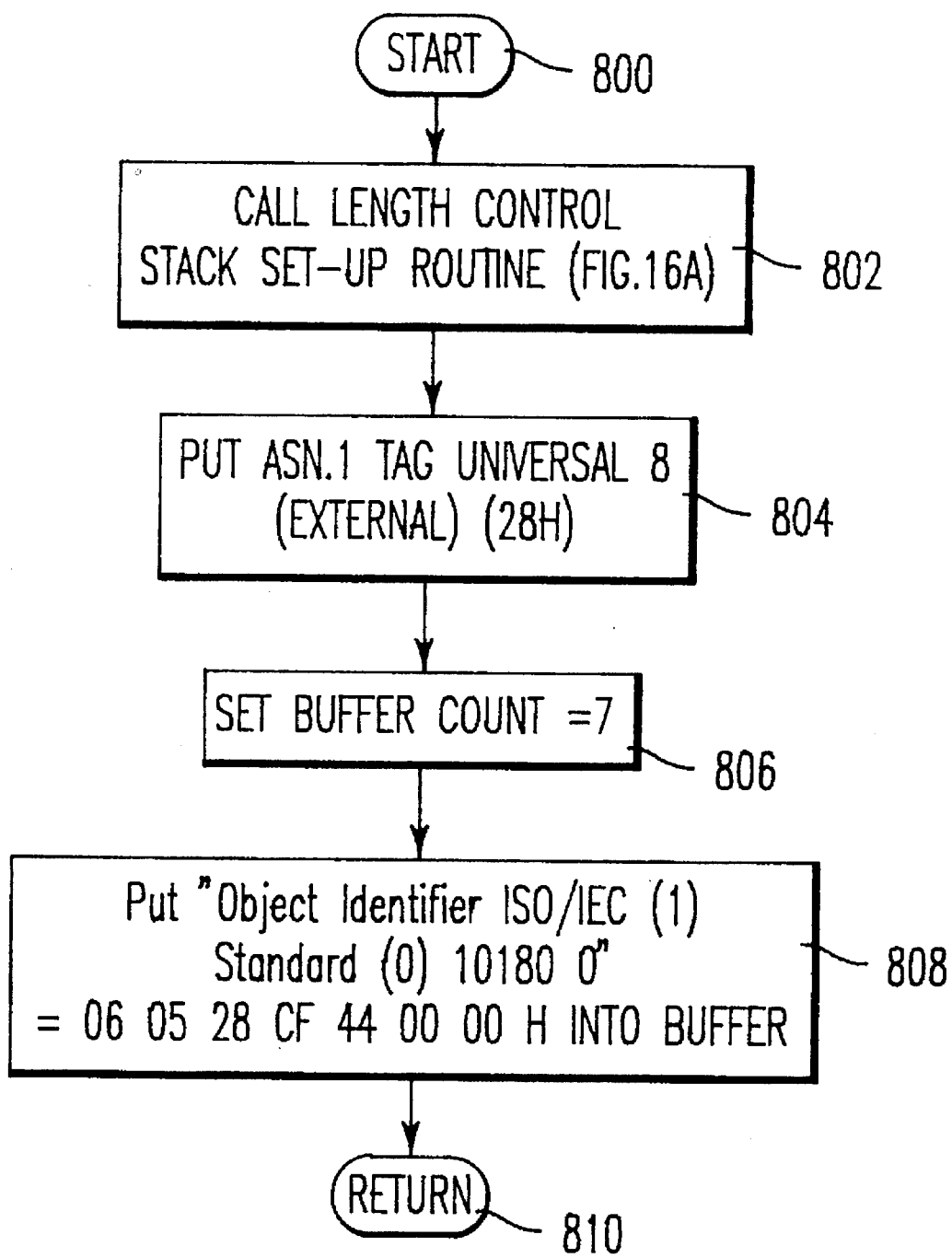
FIG. 20 illustrates a flow chart of the SPDL Begin Routine.

FIG. 18 contains a flowchart illustrating the process performed by the "Tag Processor". This process is called by step 514 of FIG. 13. It is used to process all of the tags except for the comment and token sequence tags. Step 750 examines if the clear text tag being processed is ! DOCTYPE. If it is, the "! DOCTYPE Processor" illustrated in FIG. 19 is called by step 752. Step 756 determines if there is an SPDL begin command. If there is, the "SPDL Begin Routine" illustrated in FIG. 20 is called by step 758. Step 762 determines if there is an SPDL end tag. If there is, flow proceeds to step 764 which calls the "SPDL End Routine" illustrated in FIG. 21. Step 768 then determines if the element being processed is an end tag. If it is, flow proceeds to step 774 which determines if the end tag name is the element name of the top of the length control stack. If it is not, an error message is indicated in step 776 and the process terminated because the element on the top of the stack must correspond to the element which has just ended. If the end tag is on top of the stack, flow proceeds to step 778 which calls the "End Tag Routine" illustrated in FIG. 17.

Figure 22A:
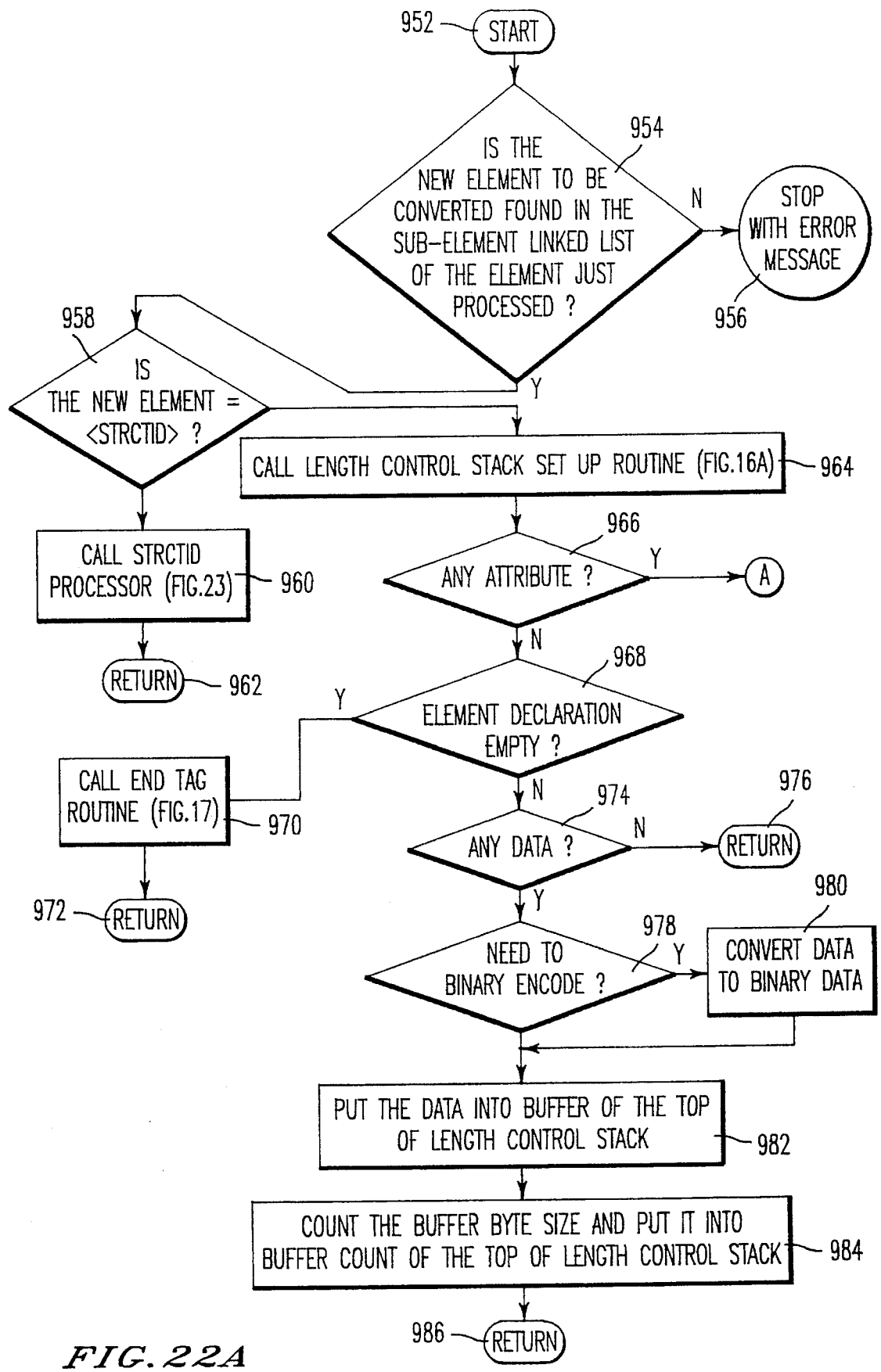

If step 768 determines that the tag is not an end tag, step 770 calls the "Start Tag Routine" illustrated in FIG. 22A. After any of the routines are called in FIG. 18 and flow returns back to FIG. 18, flow is subsequently returned to the calling process by steps 754, 760, 772 or 780.

FIG. 19 illustrates a flowchart of a process performed by the "! DOCTYPE Processor" which is called by step 752 of FIG. 18. In FIG. 19, step 782 gets the next string after the clear text ! DOCTYPE element ignoring separators such as spaces. Step 784 examines if this string, after being converted to upper case letters, is "SPDL". If it is not, there is an error because SPDL must follow the ! DOCTYPE element. If it is, step 788 sets the pointer of the input file to point after the ! DOCTYPE tag. Step 790 then sets the current element to be equal to ! DOCTYPE. It is to be noted that the length control routine is not called for the first element which is ! DOCTYPE.

FIG. 20 illustrates the "SPDL Begin Routine" called by step 758 of FIG. 18. This routine handles the SPDL start tag. First, step 802 calls the "Length Control Stack Set-Up Routine" illustrated in FIG. 16A in order to create an entry in the stack for the SPDL element. Next, step 804 writes 28H as the ASN.1 tag of the top element of the length control stack. This corresponds to the ASN.1 tag Universal 8 which is an external element. This is a known tag which is required for SPDL. Next the buffer count entry of the top element of the stack is set equal to 7 because seven elements are about to be written into the buffer of the top entry of the length control stack. Next, step 808 writes the hexadecimal representation 06 05 28 CF 44 00 00 into the buffer of the top entry of the length control stack which is equivalent to the textual representation "Object Identifier ISO/IEC (1) Standard (0) 10180 0". Last, flow returns to FIG. 18 in step 810.

Figure 21:
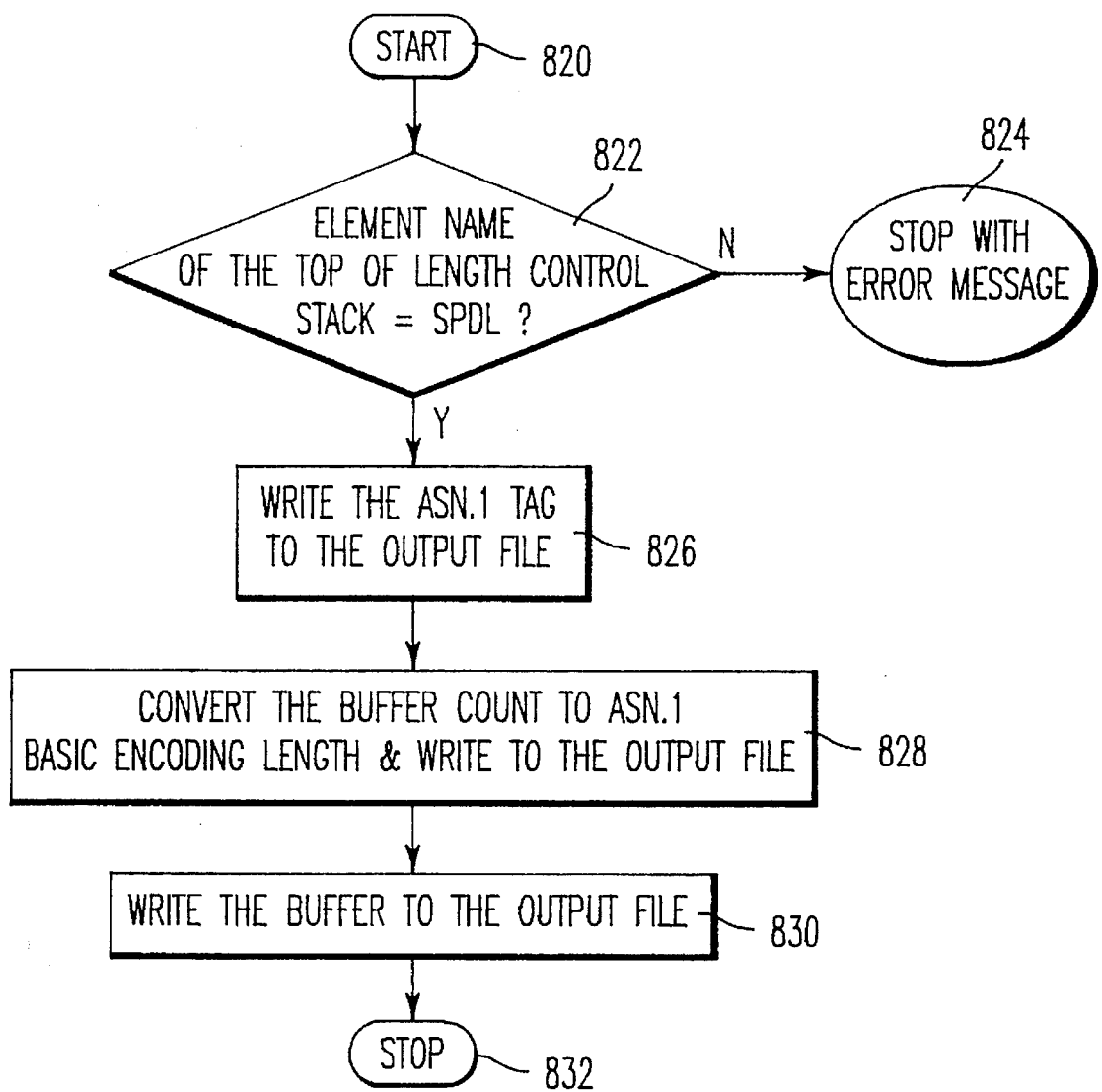
FIG. 21 illustrates a flow chart of the SPDL End Routine.

FIG. 21 illustrates a flow chart of the process performed by the "SPDL End Routine" called by step 764 of FIG. 18. In FIG. 21, step 822 examines if the element name at the top of the length control stack is equal to "SPDL". If it is not, there is an error as the ending element must be the element which is at the top of the stack. Therefore, an error message will be indicated in step 824. Otherwise, the ASN.1 tag of the SPDL element which is equal to 28H is written into the output file in step 826. The output file stores the final document which has been converted to the binary format. Step 828 then converts the buffer count of the top entry of the length control stack to a length value according to the Basic Encoding Rules of ASN.1 and writes this information to the output file. Last, the information of the buffer pointed to by the top entry in the length control stack is written to the output file. Therefore, all information of the file has been converted and written to the desired output file and the process is terminated in step 832.

Figure 22B:
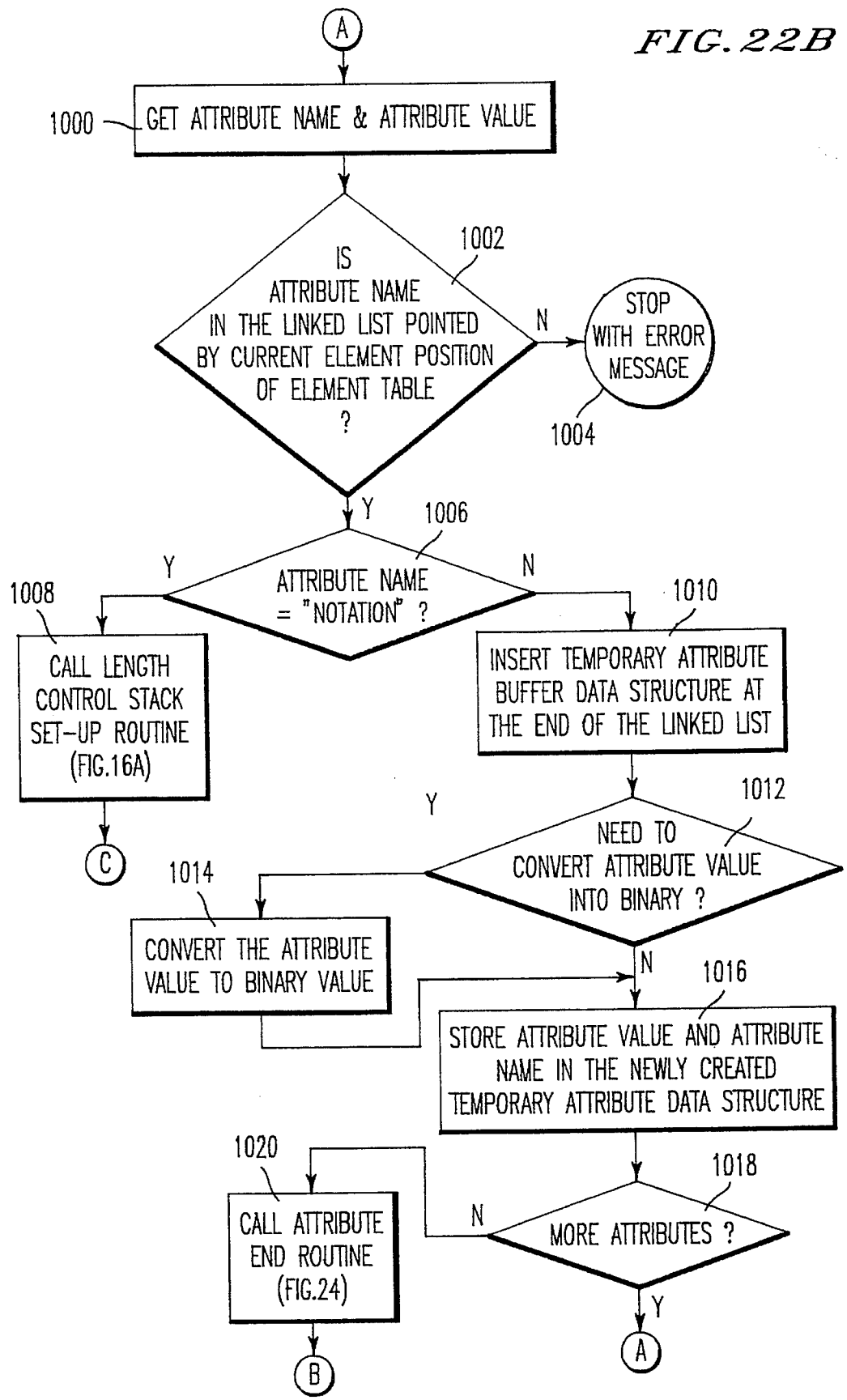
Figure 23:
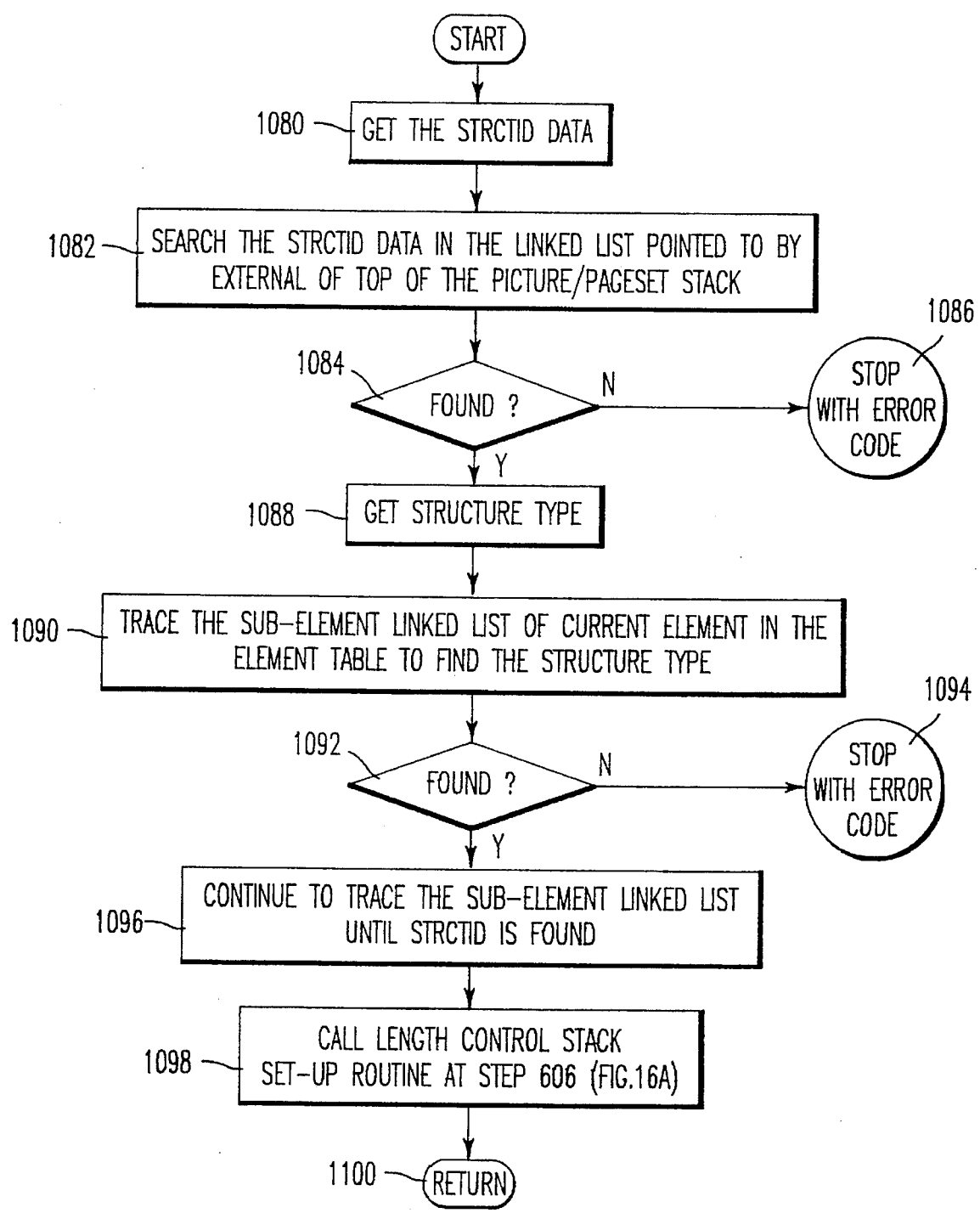
FIG. 23 illustrates a flow chart of the STRCTID Processor.

FIGS. 22A–22C illustrate the "Start Tag Routine". This routine is performed whenever a generic clear text tag which are tags other than the ! DOCTYPE, SPDL, comment, or token sequence, are to be converted. In FIG. 22A, after starting, step 954 determines if the new element to be converted is found in the sub-element linked list of the element just processed. If it is not, it is not a proper sub-element of the previous element and therefore an error message is given in step 956. If the element is a proper element, flow proceeds to step 958 which determines if the clear text tag is equal to "STRCTID." If it is, the "STRCTID Processor" illustrated in FIG. 23 is called in step 960. If it is not, flow proceeds from step 958 to step 964 which calls the "Length Control Stack Set-Up Routine" illustrated in FIG. 16A.

Next, step 966 determines if the element being processed has any attributes. If it does, flow proceeds to process A illustrated in FIG. 22B. If there are no attributes, flow proceeds to step 968 which determines if the element declaration is empty. An empty element declaration occurs when there is no data between the start tag and end tag. In this case, the end tag must be omitted.

If the element declaration is empty, flow proceeds to step 970 which calls the "End Tag Routine" illustrated in FIG. 17 with the End Tag parameter equal to Start Tag. If the element tag is not empty, step 974 determines if there is any data for the element (i.e., data for the element which follows the start tag of the element). If there is no data, flow returns to the calling process in step 976.

Step 978 determines if there is a need to encode the data to a binary format. If there is, flow proceeds to step 980 which converts the data to binary. It is believed that there may always be a need to encode to binary. However, step 978 has been included in case certain data does not need to be encoded/converted or if the SPDL Standard changes.

Step 982 then puts the data into the buffer of the top of the length control stack. Step 984 counts the number of bytes in the buffer of the top entry of the length control stack and writes this amount into the buffer count of the length control stack. Flow then returns to the calling process in step 986.

FIG. 22B illustrates process A called by FIG. 22A when it is determined that there is an attribute. In FIG. 22B, step 1000 gets the attribute name and the attribute value. Step 1002 determines if the attribute name is in the linked list pointed to by the current element position of the element table. If it is not, the attribute is not a proper sub-element and step 1004 stops the process and indicates an error message.

Step 1006 then determines if the attribute name is equal to "notation." If it is, the Length Control Stack Set-Up Routine illustrated in FIG. 16A is called and flow proceeds to process C illustrated in FIG. 22C. If the attribute name is equal to "notation," this attribute then specifies the data type between the start tag and the end tag. For example, if the Object Identifier is encoded as "n1.n2.n3 . . . " where n1, n2, and n3 . . . are decimal expressions in the clear text encoding, the binary encoding (BER) uses a different encoding scheme. Therefore, n1.n2.n3 . . . must be translated to the binary format.

If the attribute's name is not "notation," flow proceeds to step 1010 which inserts a temporary attribute buffer data structure at the end of the temporary attribute buffer linked list which consists of temporary attribute buffer data structures as illustrated in FIG. 9. Step 1012 then examines if there is a need to convert the attribute value from clear text into binary. For example, if the clear text attribute is CONTREP has a value which is equal to "ISO/IEC . . . " this value is converted to 06 06 28 CF 44 00 02 00. This is not a byte by byte conversion of the attribute but the entire attribute is examined and changed to the binary equivalent without converting each textual character individually.

Figure 24:
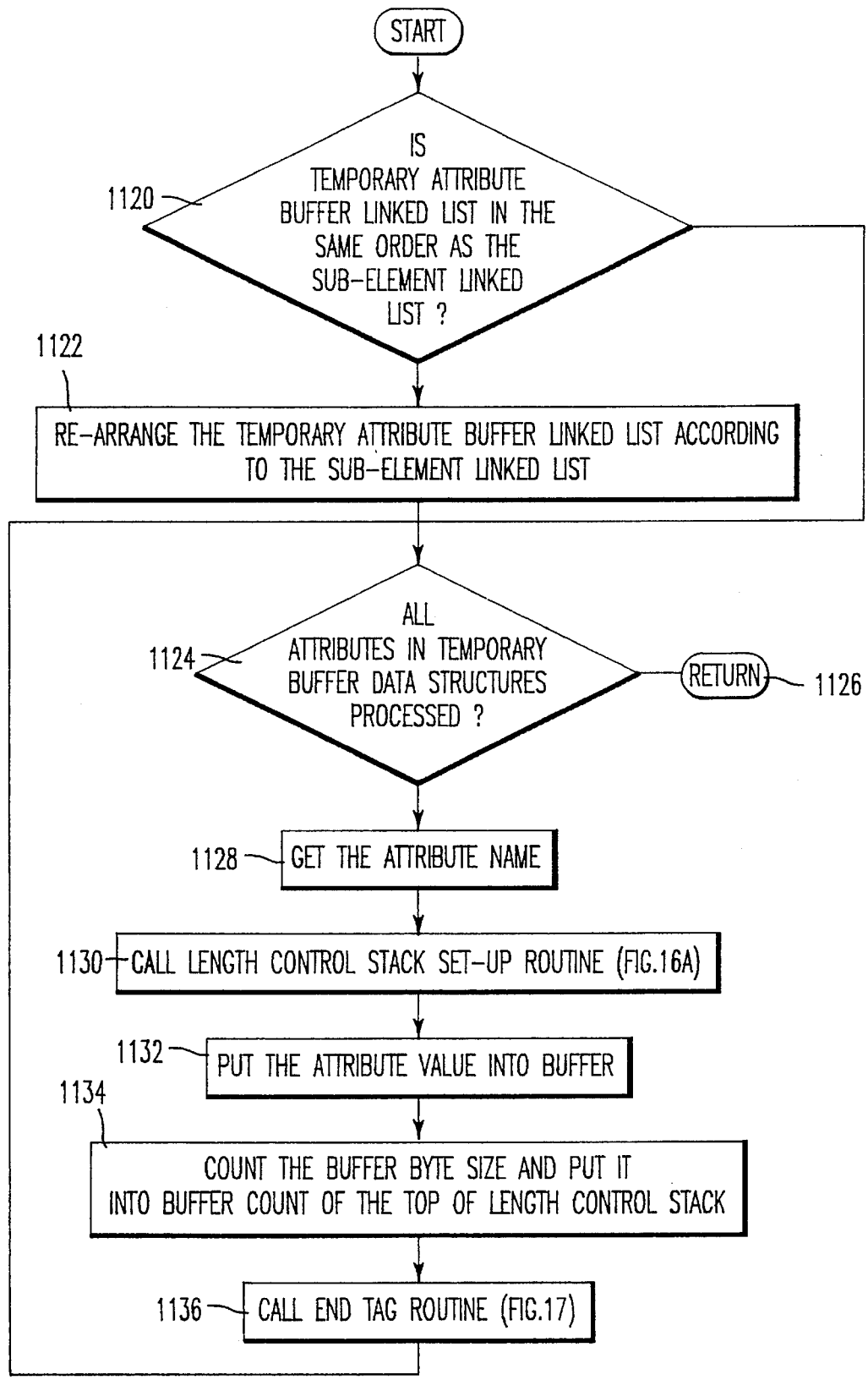
FIG. 24 illustrates a process of the Attribute End Routine.

If there is a need to convert the attribute value, step 1014 converts the attribute value to binary. Step 1016 then stores the attribute value and attribute name in the newly-created temporary attribute data structure which was created by step 1010. Step 1018 then determines if there are more attributes to be processed. If there are, flow proceeds to process A illustrated at the top of FIG. 22B. Otherwise, the "Attribute End Routine" illustrated in FIG. 24 is called in step 1020 and flow returns to process B illustrated in FIG. 22A.

In FIG. 22C, step 1030 gets the data between the start tag and end tag of the element being processed and sets the pointer of input information to point to the element after the end tag. Step 1032 determines if the attribute value is "OBJID." If it is, flow proceeds to step 1034 which sets the value in the top of the length control stack to 06H which is the ASN.1 object identifier. Step 1036 then converts the data obtained in step 1030 to binary encoding and flow proceeds to process D illustrated in FIG. 22C. Step 1038 examines if the attribute value is "ENVNM." If it is, flow proceeds to step 1040 which sets the tag value in the top of the length control stack to 43H which is ASN.1 Application 3. Flow then proceeds to process D.

Step 1042 examines if the attribute value is equal to "PUBID." If it is not, there is an error message because the value "PUBID" was expected and step 1044 indicates an error. In step 1046, it is examined if the public identifier has a corresponding object identifier. If it does, flow proceeds to step 1034. If it does not, step 1048 sets the tag value in the top of the length control stack to ASN.1 Application 2 which is represented in binary as 42H.

Step 1050 then copies the data obtained in step 1030 to the buffer of the top entry of the length control stack. Step 1052 counts the buffer byte size and puts this count into the buffer count entry of the top entry of the length control stack. Step 1054 then calls the "End Tag Routine" illustrated in FIG. 17 with appropriate End Tags twice. This routine is called twice to correspond to the two times the length control stack routine is called (step 964 in FIG. 22A and step 1008 in FIG. 22B). Flow then returns to the calling process in step 1056.

FIG. 23 illustrates the "STRCTID Processor" which is called by step 960 of FIG. 22A. The illustrated process is used to handle the clear text tag "STRCTID". There is a special routine for the STRCTID element because there can be different binary representations for the STRCTID element depending upon previous elements occurring in the file which is to be converted. For example, FIG. 11E illustrates the sub-element linked list data structures for the PICTBDY element. In FIG. 11E, it can be seen that data structure 370 and data structure 384 are both for the STRCTID sub-element. The flow chart illustrated in FIG. 23 is used to determine which of the STRCTID elements illustrated in FIG. 11E will be used during processing.

In FIG. 23, step 1080 gets the STRCTID data from the element being converted. Examples of STRCTID data which are obtained by step 1080 are Picture, Pageset, Token sequence, Pictbdy and Prologue. The STRCTID data indicates what type of information is contained within the external resource. This information is used to help determine which ASN.1 tag (e.g., A0 or A1) is used for the STRCTID in FIG. 11E.

Next, step 1082 searches for the STRCTID data in the linked list pointed to by the external declaration pointer of the data structure referred to by the top element in the picture/pageset stack (see FIG. 8). The data structures illustrated in FIG. 8 are created during actual processing of the document to be converted (as compared to the conversion process). The manner of creating and manipulating the data structures illustrated in FIG. 8 is described in detail in U.S. patent application 07/876,251 filed Apr. 30, 1992, now U.S. Pat. No. 5,325,484, and entitled "Method and System to Handle Inclusion of External Files Into a Document Processing Language", which is incorporated herein by reference.

Next, step 1084 determines if the structure ID in any of the structure ID linked list data structures illustrated in FIG. 8 corresponds to the STRCTID clear text element which is to be converted. If it does not, there is an error and step 1086 causes the process to terminate. If it is found, step 1088 obtains the structure type of the element from the corresponding structure ID linked list data structure. After the structure type is obtained, step 1090 traces the sub-element linked list of the current element to find the structure type which was found in the STRCTID linked list data structure. For example, if the structure type in the linked list illustrated in FIG. 8 is determined to be a picture, the sub-element linked list is traced to find the STRCTID corresponding to the picture.

If the structure type is not found in the sub-element linked list, flow proceeds from step 1092 to step 1094 which causes the process to stop. If the structure type is found, step 1096 continues to trace the sub-element linked list until the STRCTID element is found. Therefore, step 1090 determines the structure element and step 1096 then picks the first STRCTID after the structure element.

Step 1098 then calls the "Length Control Stack Set-Up Routine" at step 606 which is illustrated in FIG. 16A. Then the flow returns in step 110 to the calling process.

FIG. 24 illustrates the "Attribute End Routine". This routine is used to finish the conversion process of attributes which was begun in the process illustrated in FIG. 22A and 22B. In FIG. 24, step 1120 determines if the temporary attribute buffer linked list is in the same order as the attributes of the sub-element linked list for the current element. If it is not, step 112 rearranges the temporary attribute buffer linked list to have the same order as the attributes of the sub-element linked list. If it does have the same order, there is no need to rearrange the order and flow proceeds directly from step 1120 to step 1124 which examines if all of the attributes in the temporary attribute buffer data structures have been processed. The first time step 1124 is called, all attributes have not been processed and flow proceeds to step 1128 which gets the attribute name of the first attribute in the temporarily attribute buffer linked list data structure. Step 1130 calls the "Length Control Stack Set-Up Routine" illustrated in FIG. 16A. Step 1132 puts the binary attribute value into the buffer of the top entry of the length control stack. Step 1134 counts the buffer byte size and writes the size into the buffer count of the top entry of the length control stack. Step 1136 calls the "End Tag Routine" illustrated in FIG. 17 and flow loops back to step 1124. If all attributes have been processed, flow returns to the calling process. Otherwise, steps 1128–1136 are repeated.

Figure 25:
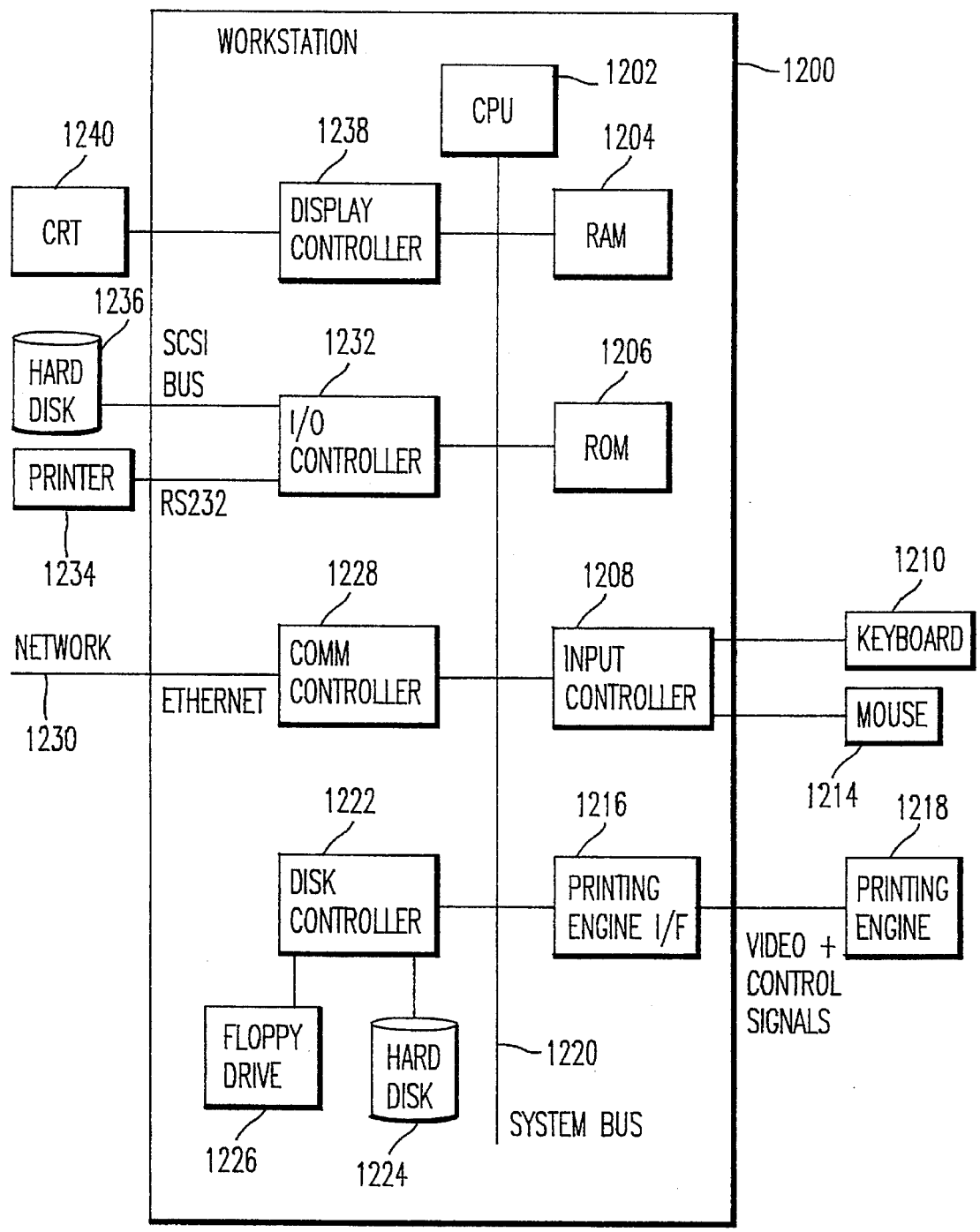
FIG. 25 illustrates an exemplary hardware embodiment of the present invention.

FIG. 25 illustrates the make-up of a workstation 1200 which can be used to execute the process of the present invention. Workstation 1200 contains CPU 1202, RAM 1204, ROM 1206, input controller 1208 connected to a keyboard 1210 and a mouse 1214. A printing engine interface 1216 is connected to a printing engine 1218 which receives video and control signals representing image data transmitted by the interface 1216. The workstation further contains a disk controller 1222 connected to a hard disk 1224 and a floppy drive 1226, a communication controller 1228 for connecting to a network 1230 which can be, for example, an Ethernet® network, and I/O controller 1232 connected to an external hard disk 1236 through a SCSI bus, for example, and a printer 1234 connected through an RS-232 cable, for example. The workstation also contains a display controller 1238 connected to a CRT 1240. The system bus 1220 connects the elements within the workstation.

The process of the present invention can be stored in any of the storage devices illustrated in FIG. 25. Further, as the process of the present invention is executing, data which is created and used during the process can be stored in any of the storage devices illustrated in FIG. 17. The CPU 1202 can be used to carry out the execution of the process of the invention.

FIG. 26 illustrates an exemplary SPDL document which will be used during an example of the execution of the conversion process of the present invention. Line 1 contains the ! DOCTYPE element. Line 2 contains the SPDL element. Line 3 contains the picture element with the attribute "content representation". Line 4 contains the PICTBDY element and line 5 contains a Prologue thereof. A further textual description of the document illustrated in FIG. 26 will not be given as these elements are known SPDL elements and a description is not necessary and is omitted for the sake of brevity.

FIGS. 27A–27W illustrate the length control stack as the example illustrated in FIG. 26 is being processed. In FIG. 27A, the SPDL Begin Tag in line 2 of FIG. 26 is processed according to the flow chart illustrated in FIG. 20. In FIG. 27B, the picture begin element is processed and the stack is as illustrated. It is to be noted that the three hyphens in FIG. 27B and throughout FIGS. 27A–27W in general refer to some byte sequence. The exact byte sequence which includes the hyphens can be determined using the flow charts contained in the drawings and described in the specification and has been omitted for brevity. In FIG. 27B, the three hyphens can be the same sequence which is pointed to by the pointer in FIG. 27A. FIGS. 27C–27H illustrate the stack as further processing of the example in FIG. 26 is performed. In FIG. 27I and the other Figures illustrating the stack as the example is being processed, the variable such as x, y, xy, yy, etc. stand for a byte(s) value. The exact byte value can be determined by tracing through the flow charts and knowing the values of the various parameters illustrated in FIG. 26. In FIG. 27J, the Current-Tag is the PROLOGUE element. FIG. 27L(2) illustrates an example of the picture/pageset stack data structure having a pointer to an external declaration data structure, and the external declaration data structure. In FIG. 27L(2), 1302 represents the picture/pageset stack, 1304 represents the data structure having a pointer to the external declaration data structure and 1306 represents the external declaration data structure. Even though a file is being converted from clear text to binary, FIG. 27L(2) illustrates the data structures which are necessary to actually process a portion of the document being converted as opposed to merely just performing a one-to-one conversion because it is necessary to determine the structure type which in FIG. 1306 is a picture for the structure ID MYPICT. FIG. 27L(2) is only one example of the data structures used to process the invention and of course, others may be used which are not illustrated and have been omitted for brevity.

Figures 27K, 27M, 27N:
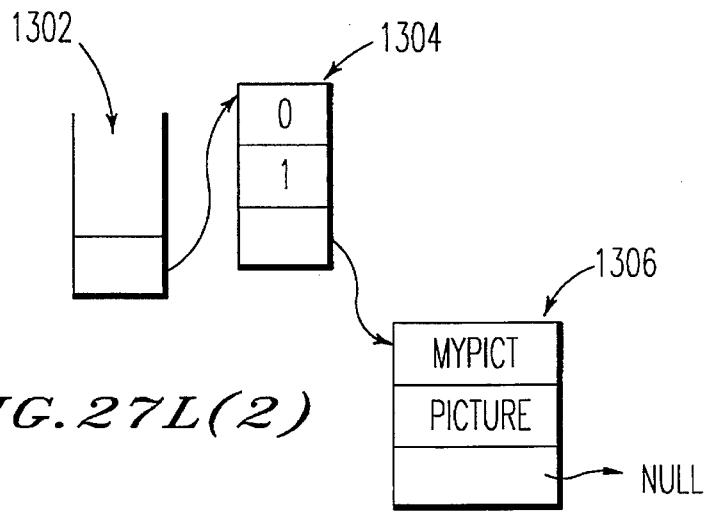
FIGS. 27A–27W illustrate the length control stack as the document illustrated in FIG. 26 is being converted to binary.

In FIG. 27M, the Current-Tag is the PROLOGUE. In FIG. 27N, the Tag-Read-In is STUPPRC, the Current-Tag is STUPPRC, and the Previous-Tag is equal to PROLOGUE. In FIG. 27S, the Current-Tag is PICTBDY. In FIG. 27T, the Tag-Read-In is STRCTID, in the external declaration data structure, the data is MYPICT (not illustrated). This is used to pick up the second STRCTID element. The Current-Tag is STRCTID and the Previous Tag is PICTBDY. The processing continues using the data structures illustrated in FIGS. 27U–27W.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by LETTERS PATENT of the United States is:

1. A method of changing a format of a file, comprising the steps of:

inputting a first element having a first representation;

converting said first element of the first representation to a second representation;

inputting a subsequent element of the first representation;

determining if a second representation of the subsequent element includes a portion which is found in the second representation of said first element;

converting said subsequent element to the second representation including said portion when said determining step determines that said portion is not found in the second representation of said first element; and converting said subsequent element to the second representation without said portion when said determining step determines that said portion is found in the second representation of said first element.

2. A method according to claim 1, wherein:

said determining step examines a flag which indicates if said second representation of said first element includes said portion.

3. A method according to claim 1, wherein data structures having at least two different fields are used to store conversion information used by each of said converting steps to convert corresponding elements of the first representation including said first element and said subsequent element to said second representation, one of said at least two different fields being used to store conversion information of the element which is always required to appear in the second representation of the corresponding element and another of said at least two different fields being used to store said portion of the corresponding element.

4. A method according to claim 3, wherein said data structures are linked list data structures.

5. A method according to claim 1, wherein said first representation is a textual representation and said second representation is a binary representation.

6. An apparatus for changing a format of a file, comprising:

means for inputting a first element having a first representation;

means for converting said first element of the first representation to a second representation;

means for inputting a subsequent element of the first representation;

means for determining if a second representation of the subsequent element includes a portion which is found in the second representation of said first element;

means for converting said subsequent element to the second representation including said portion when said means for determining determines that said portion is not found in the second representation of said first element; and means for converting said subsequent element to the second representation without said portion when said means for determining determines that said portion is found in the second representation of said first element.

7. An apparatus according to claim 6, wherein:

said determining means examines a flag which indicates if said second representation of said first element includes said portion.

8. An apparatus according to claim 6, wherein data structures having at least two different fields are used to store conversion information used by each of said converting means to convert corresponding elements of the first representation including said first element and said subsequent element to said second representation, one of said at least two different fields being used to store conversion information of the element which is always required to appear in the second representation of the corresponding element and another of said at least two different fields being used to store said portion of the corresponding element.

9. An apparatus according to claim 8, wherein said data structures are linked list data structures.

10. An apparatus according to claim 6, wherein said first representation is a textual representation and said second representation is a binary representation.

11. A method of changing a format of a file, comprising the steps of:

inputting a first element having a first representation;

converting said first element of the first representation to a first element of a second representation;

inputting a subsequent element of the first representation, said subsequent element having a plurality of second representations;

converting said subsequent element of the first representation to one of said second representations thereof by choosing one of the plurality of said second representations of the subsequent element which is a correct sub-element for said first element.

12. A method according to claim 11, wherein said step of converting said subsequent element traces through a sub-element linked list containing said first element and a plurality of representations of said subsequent element and chooses said one of the plurality of said second representations of the subsequent element by choosing a first representation of said subsequent element which appears after said first element in said sub-element linked list.

13. A method according to claim 12, wherein said subsequent element is a Standard Page Description Language STRCTID element.

14. A method according to claim 11, wherein said subsequent element is a Standard Page Description Language STRCTID element.

15. A method according to claim 11, wherein said first format is a textual format and said second format is a binary format and each of said converting steps convert from the textual format to the binary format.

16. An apparatus for changing a format of a file, comprising:

means for inputting a first element having a first representation;

means for converting said first element of the first representation to a first element of a second representation;

means for inputting a subsequent element of the first representation, said subsequent element having a plurality of second representations;

means for converting said subsequent element of the first representation to one of said second representations thereof by choosing one of the plurality of said second representations of the subsequent element which is a correct sub-element for said first element.

17. An apparatus according to claim 16, wherein said means for converting said subsequent element traces through a sub-element linked list containing said first element and a plurality of representations of said subsequent element and chooses said one of the plurality of said second representations of the subsequent element by choosing a first representation of said subsequent element which appears after said first element in said sub-element linked list.

18. An apparatus according to claim 17, wherein said subsequent element is a Standard Page Description Language STRCTID element.

19. An apparatus according to claim 16, wherein said subsequent element is a Standard Page Description Language STRCTID element.

* * * * *

UNITED STATES PATENT AND TRADEMARK OFFICE
CERTIFICATE OF CORRECTION

PATENT NO. : 5,504,891
DATED      : April 2, 1996
INVENTOR(S): Tetsuro MOTOYAMA, et al.

It is certified that error appears in the above-indentified patent and that said Letters Patent is hereby corrected as shown below:

On the title page, Item [63], the Related U.S. Application Data, in the first line, Mar. 9, 1993 should read:

--Mar. 9, 1994--

Signed and Sealed this

Ninth Day of July, 1996

Attest:

BRUCE LEHMAN

Attesting Officer    Commissioner of Patents and Trademarks